(12) United States Patent
Wunder et al.

(10) Patent No.: US 10,731,010 B2
(45) Date of Patent: Aug. 4, 2020

(54) MULTI-IONIC SALTS AND USES THEREOF

(71) Applicant: Temple University—Of The Commonwealth System of Higher Education, Philadelphia, PA (US)

(72) Inventors: Stephanie Wunder, Chadds Ford, PA (US); Parameswara Rao Chinnam, Ambler, PA (US)

(73) Assignee: TEMPLE UNIVERSITY—OF THE COMMONWEALTH SYSTEM OF HIGHER EDUCATION, Philadelphia, PA (US)

( * ) Notice: Subject to any disclaimer, the term of this patent is extended or adjusted under 35 U.S.C. 154(b) by 0 days.

(21) Appl. No.: 16/002,044

(22) Filed: Jun. 7, 2018

(65) Prior Publication Data

US 2018/0355116 A1 Dec. 13, 2018

Related U.S. Application Data

(60) Provisional application No. 62/516,499, filed on Jun. 7, 2017.

(51) Int. Cl.

| | |
|---|---|
| *C08G 77/58* | (2006.01) |
| *C08G 77/398* | (2006.01) |
| *H01M 4/13* | (2010.01) |
| *C08K 5/56* | (2006.01) |
| *H01M 10/0568* | (2010.01) |
| *H01M 10/0569* | (2010.01) |
| *C08G 77/00* | (2006.01) |
| *H01M 10/0525* | (2010.01) |

(52) U.S. Cl.
CPC .......... *C08G 77/58* (2013.01); *C08G 77/398* (2013.01); *C08K 5/56* (2013.01); *H01M 4/13* (2013.01); *H01M 10/0568* (2013.01); *H01M 10/0569* (2013.01); *C08G 77/70* (2013.01); *H01M 10/0525* (2013.01); *H01M 2300/0028* (2013.01)

(58) Field of Classification Search
CPC ...... C08G 77/045; C08G 77/24; C08G 77/26; C08G 77/398; H01M 4/13; C08K 5/56
See application file for complete search history.

(56) References Cited

U.S. PATENT DOCUMENTS

| | | | | |
|---|---|---|---|---|
| 6,100,417 A | * | 8/2000 | Lichtenhan | C07F 7/21 528/25 |
| 9,873,827 B2 | | 1/2018 | Chakraborty | |
| 2015/0259478 A1 | * | 9/2015 | Zelisko | C07F 7/21 524/588 |
| 2018/0226679 A1 | | 8/2018 | Pan | |

FOREIGN PATENT DOCUMENTS

EP 2952518 12/2015

OTHER PUBLICATIONS

Ma (Angew. Chem. Int. Ed., (2016) 55, 2521-2525).*
Chinnam et al, 2011, Chem Mater 23:5111-5121.
Meziane, et al., Electrochimica Acta 2011, 57, 14-19.

* cited by examiner

*Primary Examiner* — Kuo Liang Peng
(74) *Attorney, Agent, or Firm* — Riverside Law LLP

(57) ABSTRACT

The invention provides a novel composition comprising a multi-ionic polyoligomeric silsesquioxane and a polyether solvent, optionally with an additional lithium salt. The composition of the invention allows for improved lithium ion transference over lithium salts alone by avoiding the problem of ion aggregation that reduces conductivity in single ion conductors. Also provided is a method for forming such a composition and a liquid electrolyte comprising a multi-ionic polyoligomeric silsesquioxane and a polyether solvent, optionally with an additional lithium salt.

20 Claims, 19 Drawing Sheets

Figure 1A
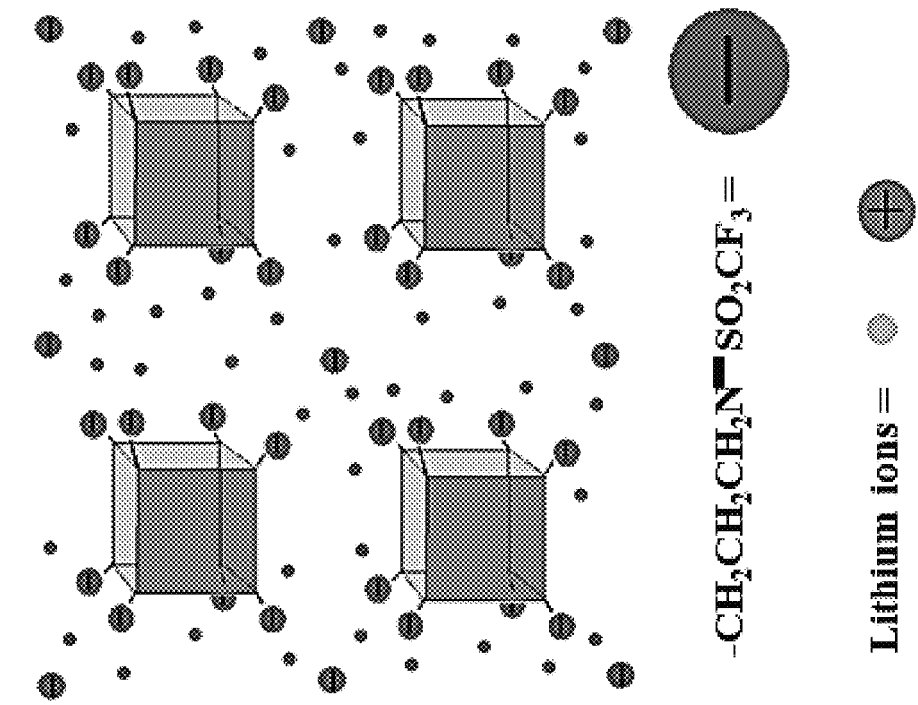
Figure 1B
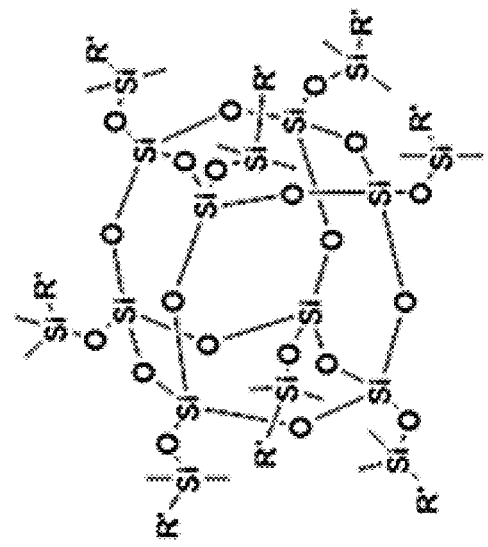
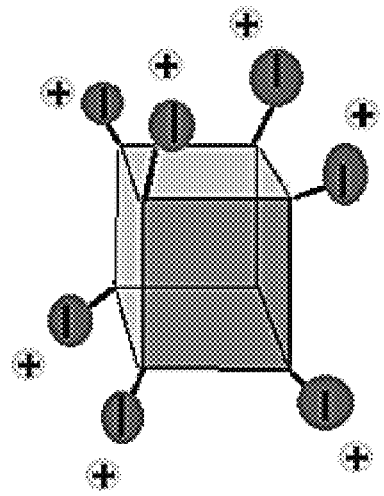

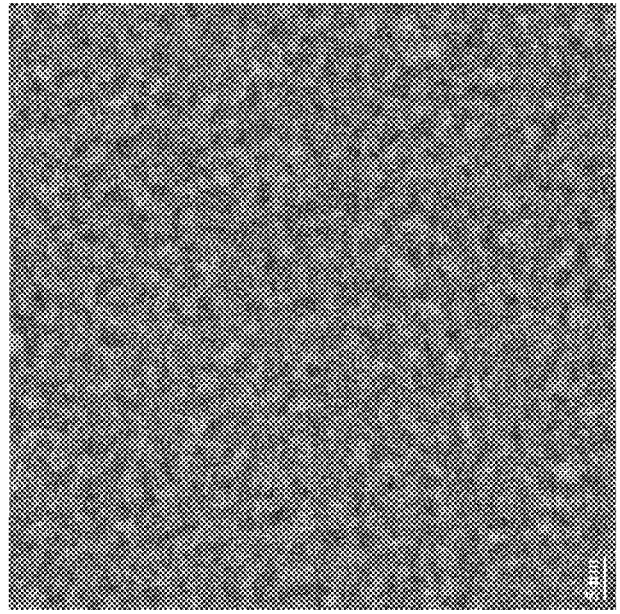
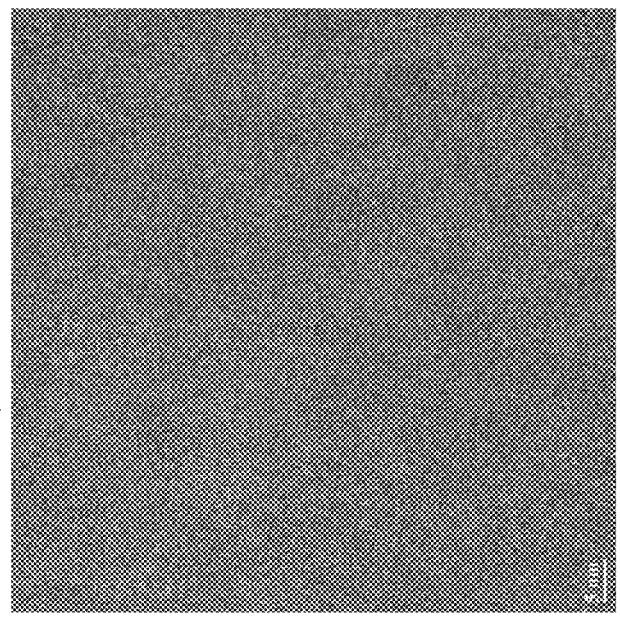

MULTI-IONIC SALTS AND USES THEREOF

CROSS-REFERENCE TO RELATED APPLICATIONS

The present application claims priority to U.S. Provisional Application No. 62/516,499, filed Jun. 7, 2017, which is incorporated by reference herein in its entirety.

STATEMENT REGARDING FEDERALLY SPONSORED RESEARCH OR DEVELOPMENT

This invention was made with government support under Grant No. 1437814 awarded by the National Science Foundation. The government has certain rights in the invention.

BACKGROUND OF THE INVENTION

One of the major problems in the development of separators for lithium ion or metal batteries (LIBs, LMBs) is to optimize both ionic conductivity ($\sigma$) and lithium ion transference number, $t_{Li}^+$, the fraction of the charge carried by the electroactive $Li^+$ ions. For $t_{Li}^+ \to 1$, the anions do not move, and therefore concentration polarization does not develop. Concentration gradients adversely affect cell performance by contributing to the growth of dendrites, which are branched or needle-like structures that form instead of desirable flat, uniform $Li^0$ deposition. Dendrites can break off, causing a decrease in energy density, or span the cell separator causing internal shorting, heating, thermal runaway and catastrophic cell failure. Dendrites are particularly a concern for lithium metal batteries (LMBs), but also occur in lithium ion batteries (LIBs), since $Li^0$ metal rather than intercalated $Li^+$ can deposit on the anode in LIBs during fast charging or at low temperatures (Armand and Tarascon, Nature 2008, 451, (7179), 652-657). The transition from graphitic to metallic lithium anodes would enhance energy density 10-fold, and metallic lithium anodes would enable the use of unlithiated materials such as sulfur or air to replace intercalation cathodes for lithium/sulfur or lithium/air batteries (Bruce, et al., Nature Materials 2012, 11, (1), 19-29; Grande, et al., Advanced Materials 2015, 27, (5), 784-800) with improved energy density. In these cases, the safety issues associated with dendrite growth when using metallic $Li^0$ are a major concern.

There has been extensive theoretical and experimental research on the prevention of dendritic growth, including mechanical inhibition (Monroe and Newman, Journal of the Electrochemical Society 2005, 152, (2), A396-A404) and limiting concentration gradients that result in anion depletion near the anode (Chazalviel, Phys. Rev. A 1990, 42, (12), 7355-7367). The latter can be avoided by the use of electrolytes with high ionic conductivities and low anion mobilities, i.e. single ion conductors (SICs). Concentration gradients are avoided in polymer single ion conductors (SICs) by covalent attachment of the anions to the polymer backbone so that $t_{Li}^+ \to 1$. However, conductivities of polymer SICs have remained low ($\sigma < 10^{-6}$ S/cm). In polymer electrolytes, the cation motion is believed to be coupled to the backbone dynamics, so attempts to increase conductivity have included incorporating flexible chains with low glass transition temperatures ($T_g$s) such as polydimethylsiloxanes. As in the case of bi-ionic conductors, the conductivity increases as the electron withdrawing groups of the anion increase, and as the negative charge becomes more delocalized. Thus, replacement of carboxylate, phosphate and sulfonate anions with the LiTFSI-like anion in lithium[(4-styrenesulfonyl) trifluoromethane-sulfonyl)imide] (Meziane, et al., Electrochimica Acta 2011, 57, 14-19; Feng, et al., Electrochimica Acta 2013, 93, 254-263) and poly[(4-styrenesulfonyl) (trifluoromethyl (S-trifluoromethylsulfonylimino) sulfonyl) imide] (Ma, et al., Angewandte Chemie-International Edition 2016, 55, (7), 2521-2525) have resulted in the best ion conductivities to date.

There is also evidence that dendrites can be blocked in liquid electrolytes with cellulose-based separators with small pores (50-100 nm) (Yu, et al., ACS Energy Letters 2016, 1, (3), 633-637), or in solid or gel electrolytes if channels are formed in the matrix that are smaller than a critical dimension, i.e. two small for infiltration of dendrites (Tu, et al., Advanced Energy Materials 2014, 4, (2), 6; Tu, et al., Accounts of Chemical Research 2015, 48, (11), 2947-2956). This was also suggested to be the case for liquid electrolytes encapsulated within close-packed hollow, porous silica spheres (Zhang, et al., Nano Letters 2015, 15, (5), 3398-3402). Modelling studies of electrodeposition also predicted that stability (i.e. lack of dendrites) was increased in electrolytes when a small fraction of the anions were immobilized due to a reduction in the electric field at the $Li^0$ electrode (Tikekar, et al., Journal of the Electrochemical Society 2014, 161, (6), A847-A855).

There remains a need in the art for single ion conductors with high ionic conductivity and lithium ion transference number. The present invention fulfills this unmet need.

SUMMARY OF THE INVENTION

In one aspect, the present invention relates to a composition comprising: a polyether solvent; and a polyoligomeric silsesquioxane of Formula (I):

$$[(O_{1.5})Si\text{-}L\text{-}X]_n Y_n,  \qquad \text{Formula (I);}$$

wherein n is an even integer; L is a divalent linking group; Y is a cationic group selected from the group consisting of $Li^+$, $Na^+$, $K^+$, and $Mg^{2+}$; and X is an anionic group.

In one embodiment, the polyether solvent is tetraglyme.
In one embodiment, n is 8.
In one embodiment, L is selected from the group consisting of alkyl, siloxane, heteroatom, and combinations thereof. In one embodiment, L is $-OSi(Me)_2(CH_2)_3-$; wherein the O is bound to the silicon atom of Formula (I).
In one embodiment, X is $-[NSO_2CF_3]^-$.
In one embodiment, the polyoligomeric silsesquioxane of Formula (I) is a polyoligomeric silsesquioxane of Formula (II):

$$[(O_{1.5})Si\text{---}OSi(Me)_2(CH_2)_3\text{---}NSO_2CF_3]_n Li_n, \qquad \text{Formula (II);}$$

wherein n is an even integer selected from the group consisting of 6, 8, 10, and 12.

In one embodiment, the composition further comprises an additional lithium salt. In one embodiment, the additional lithium salt is selected from the group consisting of lithium bis(trifluoromethanesulfonyl)imide, lithium trifluoromethanesulfonate, and lithium tetrafluoroborate. In one embodiment, the weight ratio of the additional lithium salt to the polyoligomeric silsesquioxane of Formula (I) is about 80/20. In one embodiment, ratio of the number ether oxygens in the polyether solvent to the number of $Li^+$ ions in the composition is between about 20/1 and about 9/1.

In one aspect, the present invention relates to a liquid electrolyte comprising arrays of disordered particles of a polyoligomeric silsesquioxane of Formula (I) in a polyether solvent.

In one embodiment, the liquid electrolyte further comprises lithium bis(trifluoromethanesulfonyl)imide. In one embodiment, the ratio of the number ether oxygens in the polyether solvent to the number of Li$^+$ ions in the polyoligomeric silsesquioxane of Formula (I) and the additional lithium salt is about 17.1/1. In one embodiment, the polyether solvent is tetraglyme.

In one embodiment, L is —OSi(Me)$_2$(CH$_2$)$_3$—; wherein the O is bound to the silicon atom of Formula (I); and X is —[NSO$_2$CF$_3$]$^-$.

In one aspect, the present invention relates to a battery comprising a liquid electrolyte of the invention.

In one aspect, the present invention relates to a method for forming a composition, the method comprising adding a polyoligomeric silsesquioxane of Formula (I) to a polyether solvent under an inert atmosphere.

In one embodiment, the method further comprises the step of adding an additional lithium salt to the polyether solvent. In one embodiment, the additional lithium salt is lithium bis(trifluoromethanesulfonyl)imide.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1, comprising FIGS. 1A and 1B, depicts POSS-(LiTFSI)$_8$ and its behavior in solution. FIG. 1A depicts the structure of polyhedral oligomeric silsesquioxane (POSS) octasubstituted with eight lithium[butyltrifluoromethanesulfonyl)imide] groups. FIG. 1B depicts the interactions between POSS-(LiTFSI)$_8$ molecules in solution.

FIG. 2, comprising FIG. 2A depicts ion pairs and ion triplets in LiX salts and an ion quadropole in a polymer SIC. FIG. 2B depicts the interaction of tetraglyme (G$_4$) with the TFSI$^-$ anion.

FIG. 10, comprising FIGS. 10A and 10B, compare exemplary compound G$_4$/(POSS-LiTFSI)$_8$ to an empty grid. FIG. 10A is a TEM image of an empty grid. FIG. 10B is a TEM image of a grid with G$_4$/(POSS-LiTFSI)$_8$, 1/1 molar ratio (O/Li=4/1), polymerized in polyethylene glycol methyl ether acrylate (PEGMEA).

FIG. 11, comprising FIG. 11A depicts the EDX of the empty grid. FIG. 11B depicts the EDX of the grid with G$_4$/(POSS-LiTFSI)$_8$, 1/1 molar ratio (O/Li=4/1), polymerized in PEGMEA, showing Si in the sample.

FIG. 13, comprising FIG. 13A is the DSC thermogram for the second heating cycle of G$_4$/POSS-(LiTFSI)$_8$. FIG. 13B is the DSC thermogram for the second heating cycle of G$_4$/LiTFSI.

FIG. 16, comprising FIG. 16A shows the change in Z" vs Z' over 11 days. FIG. 16B shows the change in the bulk and interfacial resistance over 11 days.

FIG. 18, comprising FIG. 18A is a plot of Cell voltage vs specific capacity. FIG. 18B is a plot of coulombic efficiency as a function of cycle number for the Li/(G$_4$/POSS-(LiTFSI)$_8$ O/Li=16/1)/LiFePO$_4$ cell.

DETAILED DESCRIPTION

Figure 2A:
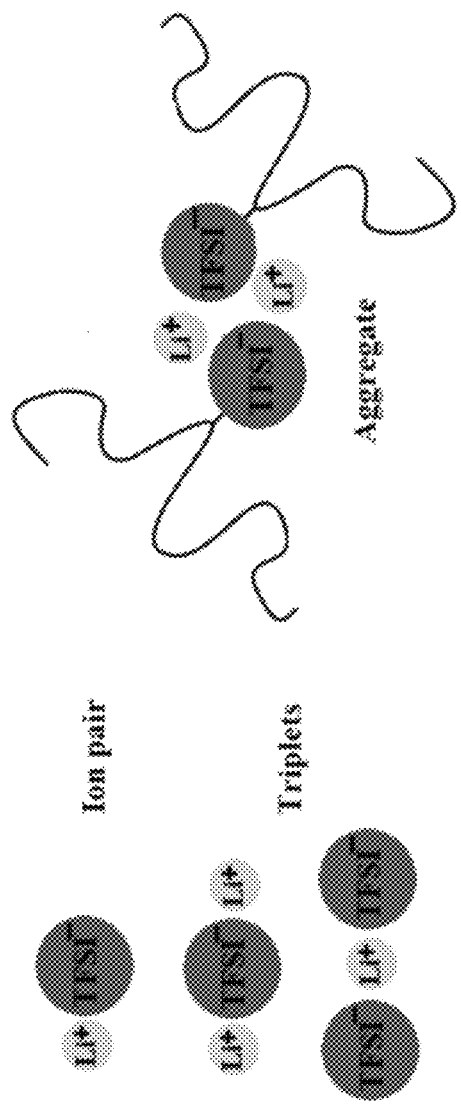
FIGS. 2A and 2B, depict aggregation behaviors observed in LiX salts and polymer SICs.

The invention relates to multi-ionic lithium salts comprised of polyoligomeric silsesquioxanes (POSS) functionalized with anionic groups. The invention further relates to batteries comprising the functionalized POSS compositions.

Definitions

It is to be understood that the figures and descriptions of the present invention have been simplified to illustrate elements that are relevant for a clear understanding of the present invention, while eliminating, for the purpose of clarity, many other elements found in the art related to salt compositions, battery technology, electrolytes, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms.

The term "alkoxy" as used herein intends an alkyl group bound through a single, terminal ether linkage; that is, an "alkoxy" group may be defined as —OR where R is alkyl as defined above.

The term "aryl" as used herein refers to a monocyclic aromatic species of 5 to 7 carbon atoms. Optionally, these groups are substituted with one to four, or one to two, alkyl, alkoxy, hydroxy, and/or nitro substituents or the like.

"Optional" or "optionally" means that the subsequently described circumstance may or may not occur, and that the description includes instances where said circumstance occurs and instances where it does not. For example, the phrase "optional covalent bond" means that a covalent bond may or may not be present and that the description includes both the instance when the covalent bond is present and the instance when the covalent bond is not present.

"Halo" or "halogen" refers to fluoro, chloro, bromo, or iodo, and usually relates to halo substitution for a hydrogen atom in an organic compound or to a halogen salt wherein the halogen carries a negative charge.

The articles "a" and "an" are used herein to refer to one or more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Abbreviations: LIB: lithium ion battery; SIC: single ion conductor; σ: conductivity; $t_{Li}^+$: lithium ion transference number; $G_4$: tetraglyme; $R_{int}$: interfacial resistance; LiTFSI: Lithium bis(trifluoromethanesulfonyl)imide; POSS: polyoligomeric silsesquioxane POSS-(LiTFSI)$_8$: polyoligomeric silsesquioxanes functionalized with eight lithium[butyltrifluoromethane-sulfonyl)imide] groups.

Description

The present invention is based, in part, on the unexpected finding that multi-ionic polyoligomeric silsesquioxane (POSS) with highly dissociative lithium salts avoid the problem of ion aggregation. Accordingly, the invention provides novel POSS compounds functionalized with Li-TFSI-type salts. The present invention also provides a composition comprising the POSS compounds of the invention. In one embodiment, the composition further comprises an aprotic solvent. In some embodiments, the aprotic solvent comprises a polymerizable group. In one embodiment, the polymerizable group is polymerized to for a solid polymer electrolyte. In one embodiment, the aprotic solvent further comprises a gelation agent to form a gel electrolyte.

In another aspect, the present invention provides a liquid electrolyte comprising a POSS of the invention. In some embodiments, the liquid electrolyte further comprises a free lithium salt. In yet another embodiment, the invention provides batteries and cells comprising a POSS of the invention. The batteries of the invention have high ionic conductivity and lithium ion transference number.

Multi-Ionic Polyhedral Oligomeric Silsesquioxanes

In one aspect, the invention provides multi-ionic polyoligomeric silsesquioxane (POSS) salts of Formula (I), $[(O_{1.5})Si-L-X]_nY_n$, wherein in Formula (I) L is a linker, X is an anionic group, and Y is a cationic group.

Typically, POSS compounds are crystalline solids that are sublimable under vacuum and that have a wide range of melting points and decomposition temperatures near or exceeding about 400° C. However, inclusion and/or variation of organic groups in the POSS compounds can change their physical properties.

In some embodiments of the invention, the multi-ionic POSS salts are cage compounds, such as in the case where n is an even integer. In one embodiment, POSS cage compounds have n vertices with n appendant R groups, each bound to a silicon atom; each silicon atom is also bound to three oxo groups. POSS cage compounds can also be called $T_n$ cages, wherein T stands for tetrahedral vertex. In one embodiment, n is 8 and POSS can also mean polyoctahedral silsesquioxane. In one embodiment, n is 10. In one embodiment, n is 6. In one embodiment, n is 12. In one embodiment, a $T_8$ cage is converted to a $T_{10}$ cage via treatment with a strong acid.

In one embodiment, each silicon atom of the POSS compound is substituted with -L-X, wherein L is a linker group and X is an anionic group. Each occurrence of L may be the same or different. Each occurrence of X may be the same or different. Each occurrence of Y may be the same or different. In one embodiment, L represents a divalent linker group.

In one embodiment, Y is a cationic group. Exemplary cationic groups include, but are not limited to, $Li^+$, $Na^+$, $K^+$, or $Mg^+$. In one embodiment, each occurrence of Y is independently selected from $Li^+$, $Na_+$, $K^+$, and $Mg^{2+}$. In one embodiment, each occurrence of Y is $Li^+$.

The linker L may be any suitable linker, as would be understood by one of ordinary skill the art. Examples of linkers include, but are not limited to, an alkyl group, a benzyl group, an aryl group, a heteroaryl group, a cycloalkyl group, an amide group, an ester, a sulfonamide, a carbamate, a carbonate, a sulfone, an organosilicon group, a silyl ether, a siloxane, an ether, an oxime, a hydrazine, a urea, a thiourea, a phosphate, a poly(alkyl ether), a heteroatom, or combinations thereof, wherein the alkyl, benzyl, aryl, heteroaryl, cycloalkyl, amide, ester, sulfonamide, carbamate, carbonate, sulfone, organosilicon, silyl ether, siloxane, ether, oxime, hydrazine, urea, thiourea, phosphate, and poly(alkyl ether) may be optionally substituted.

In one embodiment, each occurrence of L is independently selected from a single bond, alkyl, aryl, silyl, ether, alkoxy, aryloxy, silyl, methoxy, silyloxy, —N(R')—, —O—, —S—, —Se—, wherein R' alkyl or aryl group and wherein is L is optionally substituted.

In one embodiment, L is a single bond. For example, when linker L is a single bond, X is bonded directly to the Si atom. In one embodiment, L is alkyl. In one embodiment, one or more hydrogens on H can be replaced with a halogen. In one embodiment, L is perfluorinated. In one embodiment, L is aryl substituted at the 1- and 4-positions (para substitution), 1- and 3-positions (meta substitution), or 1- and 2-positions (ortho substitution). In one embodiment, L is a silyl ether. In one embodiment, L is a heteroatom selected from the group including NR', O, S, and Se, wherein R' may be an alkyl or aryl group. In one embodiment, L is selected from the group consisting of a bond, an alkyl group, a poly(alkyl ether), a silyl ether, an aryl group, and any combinations thereof. In another embodiment, L comprises an alkyl group and a siloxane. In one embodiment, L is —OSi(R')$_2$(CH$_2$)$_3$— wherein R' is an alkyl or aryl group. In one embodiment, L is —OSi(Me)$_2$(CH$_2$)$_3$—.

In one embodiment, X represents an anionic group, wherein the anionic group is selected to prevent tight binding to Li$^+$ ions. Exemplary anionic groups include, but are not limited to, —[O]$^-$, —[S(O)$_2$NS(O)$_2$CF$_3$]$^-$, —[SO$_3$]$^-$, —[BF$_3$]$^-$, —[SO$_3$BF$_3$]$^-$, —[C(SO$_2$CF$_3$)$_2$]$^-$, —[S(O)$_2$CR'SO$_2$CF$_3$]$^-$, —[NSO$_2$CF$_3$]$^-$, —[C(O)CR'C(O)R"]$^-$, —[C(O)NC(O)R"]$^-$, and the like, wherein R' is H, alkyl, or aryl, and R" is alkyl or aryl. In one embodiment, X is —[BF$_3$]$^-$. In one embodiment, X is —[BF$_3$]$^-$. In one embodiment, X is —[NSO$_2$CF$_3$]$^-$. In one embodiment, X is —[C(SO$_2$CF$_3$)$_2$]$^-$. In one embodiment, X is

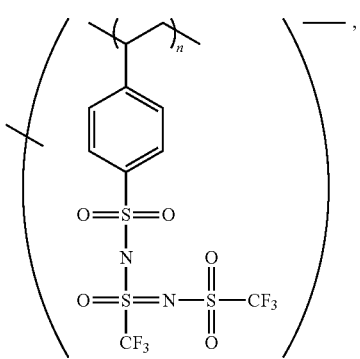

wherein n is an integer from 0 to 15. In one embodiment, X is

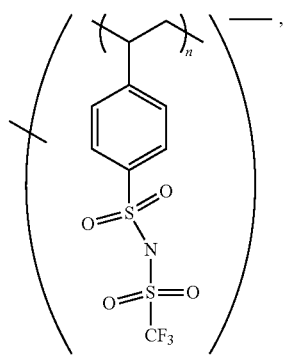

wherein n is an integer from 0 to 15.

In one embodiment, the POSS compound has a symmetrical, fully condensed silicon-oxygen framework with a functional group on each silicon atom. For example, in some embodiments, the POSS compound can have a structure of any of formulae (A)-(D):

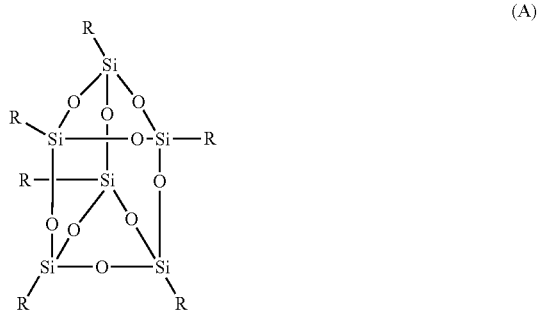

(A)

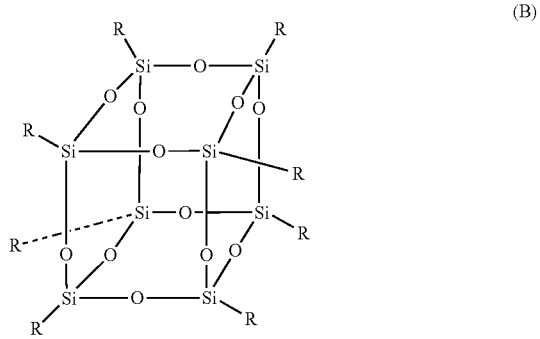

(B)

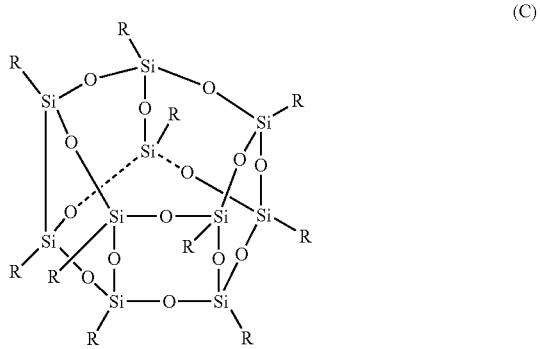

(C)

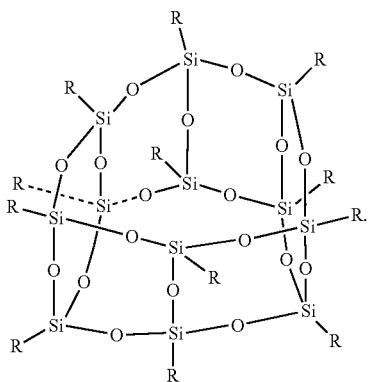

(D)

In one embodiment, the POSS compound has an incompletely condensed framework, such as those shown below in formulae (E)-(H):

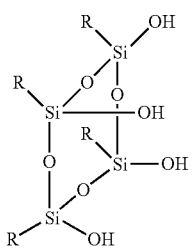

(E)

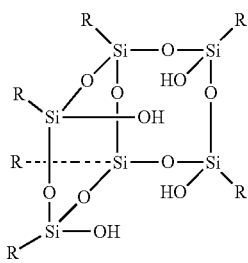

(F)

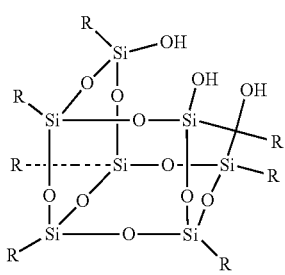

(G)

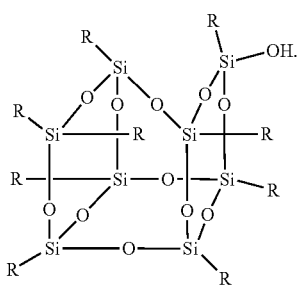

(H)

In one embodiment, in formula (A)-(H), each R independently represents (-L-X)$^-$Y$^+$. Each R group may be the same or different from one another. In one embodiment, L is a linker. In one embodiment X is an anionic group. In one embodiment, Y is a cationic group.

In one embodiment, each occurrence of L is independently selected from a single bond, alkyl, aryl, silyl, ether, alkoxy, aryloxy, silyl, methoxy, silyloxy, —N(R')—, —O—, —S—, —Se—, wherein R' alkyl or aryl group and wherein is L is optionally substituted.

In one embodiment, L is a single bond. For example, when linker L is a single bond, X is bonded directly to the Si atom. In one embodiment, L is alkyl. In one embodiment, one or more hydrogens on H can be replaced with a halogen. In one embodiment, L is perfluorinated. In one embodiment, L is aryl substituted at the 1- and 4-positions (para substitution), 1- and 3-positions (meta substitution), or 1- and 2-positions (ortho substitution). In one embodiment, L is a silyl ether. In on embodiment, L is a heteroatom selected from the group including NR', O, S, and Se, wherein R' may be an alkyl or aryl group. In one embodiment, L is selected from the group consisting of a bond, an alkyl group, a poly(alkyl ether), a silyl ether, an aryl group, and any combinations thereof. In another embodiment, L comprises an alkyl group and a siloxane. In one embodiment, L is —OSi(R')$_2$(CH$_2$)$_3$— wherein R' is an alkyl or aryl group. In one embodiment, L is —OSi(Me)$_2$(CH$_2$)$_3$—.

In one embodiment, Y is a cationic group. Exemplary cationic groups include, but are not limited to, Li$^+$, Na$^+$, K$^+$, or Mg$^{2+}$. In one embodiment, Y is selected from Li$^+$, Na$^+$, K$^+$, and Mg$^{2+}$. In one embodiment, Y is Li$^+$.

In one embodiment, X represents an anionic group, wherein the anionic group is selected to prevent tight binding to Li$^+$ ions. Exemplary anionic groups include, but are not limited to, —[O]$^-$, —[S(O)$_2$NS(O)$_2$CF$_3$]$^-$, —[SO$_3$]$^-$, —[BF$_3$]$^-$, —[SO$_3$BF$_3$]$^-$. —[C(SO$_2$CF$_3$)$_2$]$^-$, —[S(O)$_2$CR'SO$_2$CF$_3$]$^-$, —[NSO$_2$CF$_3$]$^-$, —[C(O)CR'C(O)R"]$^-$, —[C(O)NC(O)R"]$^-$, and the like, wherein R' is H, alkyl, or aryl, and R" is alkyl or aryl. In one embodiment, X is —[BF$_3$]$^-$. In one embodiment, X is —[BF$_3$]$^-$. In one embodiment, X is —[NSO$_2$CF$_3$]$^-$. In one embodiment, X is —[C(SO$_2$CF$_3$)$_2$]$^-$. In one embodiment, X is

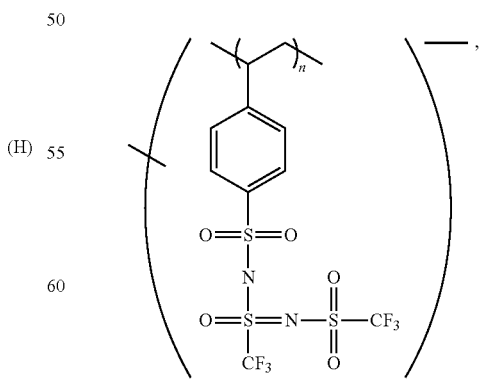

wherein n is an integer from 0 to 15. In one embodiment, X is

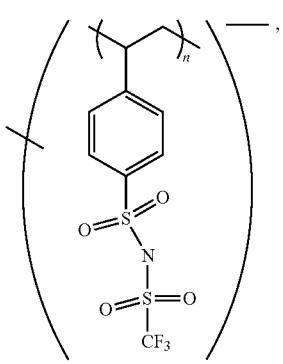

wherein n is an integer from 0 to 15.

Compositions

In one aspect, the invention provides compositions comprising multi-ionic polyoligomeric silsesquioxane (POSS) salts of Formula (I). In one embodiment, the composition comprises a POSS salt of Formula (I) and a solvent. In one embodiment, the solvent is an aprotic solvent. In one embodiment, the solvent is a polyether solvent.

In some embodiments, an aprotic solvent is added to stabilize the lithium cation by forming a complex cation. Aprotic solvents may include hydrogens, but lack O—H or N—H bonds, and therefore cannot hydrogen bond with themselves. Exemplary aprotic solvents include, but are not limited to, carbonates, esters, and ethers.

In one embodiment, the solvent is a polyether solvent. Suitable polyether solvents include, but are not limited to, monoglyme, diglyme, triglyme, tetraglyme, pentaglyme, ethyl glyme, ethyl diglyme, ethyl tetraglyme, and the like. In one embodiment, the polyether solvent is tetraglyme ($G_4$).

The amount of polyether solvent in the composition relative to the total lithium content can be measured as a ratio of oxygen atoms to lithium atom, O/Li. For example, an 8/1 molar complex of $G_4$/POSS-(LiTFSI)$_8$ can also be represented as an O/Li ratio of 5/1, as each $G_4$ contributes 5 oxygen atoms and each POSS-(LiTFSI)$_8$ contributes 8 lithium ions. In one embodiment of the invention, the O/Li ratio is about 20/1. In one embodiment of the invention, the O/Li ratio is about 19/1. In one embodiment of the invention, the O/Li ratio is about 18/1. In one embodiment of the invention, the O/Li ratio is about 17/1. In one embodiment of the invention, the O/Li ratio is about 16/1. In one embodiment of the invention, the O/Li ratio is about 15/1. In one embodiment of the invention, the O/Li ratio is about 14/1. In one embodiment of the invention, the O/Li ratio is about 13/1. In one embodiment of the invention, the O/Li ratio is about 12/1. In one embodiment of the invention, the O/Li ratio is about 11/1. In one embodiment of the invention, the O/Li ratio is about 10/1. In one embodiment of the invention, the O/Li ratio is about 9/1. In one embodiment of the invention, the O/Li ratio is about 8/1. In one embodiment of the invention, the O/Li ratio is about 7/1. In one embodiment of the invention, the O/Li ratio is about 6/1. In one embodiment of the invention, the O/Li ratio is about 5/1. In one embodiment of the invention, the O/Li ratio is about 4/1. In one embodiment of the invention, the O/Li ratio is about 3/1. In one embodiment of the invention, the O/Li ratio is about 2/1. In one embodiment of the invention, the O/Li ratio is about 1/1.

In some embodiments, the composition of the invention includes at least one additional lithium salt. The additional lithium salt can be any known to those of skill in the art. Exemplary lithium salts include $LiClO_4$, $LiPF_6$, $LiAsF_6$, $LiBF_4$, $LiCF_3SO_3$, $LiN(CF_3SO_2)_2$ (LiTFSI), $LiCH(CF_3SO_2)_2$, and $LiC(CF_3SO_2)_3$. In one embodiment, the additional lithium salt is $LiN(CF_3SO_2)_2$ (LiTFSI).

In one embodiment, the composition of the invention comprises a one or more of the side chain groups of a POSS compound of the invention. For example, in one embodiment, the POSS side chain is represented by the group R in Formulae (A)-(H). In one embodiment, the side chain R independently represents (-L-X)$^-$Y$^+$.

In some embodiments of the invention, the weight ratio of additional lithium salt to multi-ionic POSS salt is between about 100/0 to about 0/100. In one embodiment, the weight ratio of additional lithium salt to multi-ionic POSS salt is about 90/10. In one embodiment, the weight ratio is about 80/20. In one embodiment, the weight ratio is about 70/30. In one embodiment, the weight ratio is about 60/40. In one embodiment, the weight ratio is about 50/50. In one embodiment, the weight ratio is about 40/60. In one embodiment, the weight ratio is about 30/70. In one embodiment, the weight ratio of additional lithium salt to multi-ionic POSS salt is about 20/80. In one embodiment, the weight ratio is about 10/90. In embodiments, wherein the composition comprises the additional lithium salt, the additional lithium salt contributes to the O/Li ratio. For example, a molar ratio of $G_4$/LiTFSI/POSS-(LiTFSI)$_8$ of 6.75/1.67/0.0372 can be represented as an O/Li ratio of 17.1/1. In one embodiment, the molar ratio of $G_4$/LiTFSI/POSS-(LiTFSI)$_8$ is about 6.75/1.67/0.0372 (O/Li~17.1).

In one embodiment, the invention provides ionogels comprising a POSS of the invention. In one embodiment, the ionogels can be formed from ionic liquids and POSS-based lithium salts dissolved in the ionic liquid. Ionic liquids are formed by the association of cations and anions and are in the liquid state at a temperature close to room temperature. They have noteworthy properties, such as zero volatility, high ionic conductivity and also catalytic properties.

Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO4), 1-Ethyl-3-methylimidazolium hexafluorophosphate, and 1-Hexyl-3-methylimidazolium tetrafluoroborate.

The ionogel may comprise any suitable ionic liquid. For example, the ionic liquid may comprise any suitable anion, e.g., an anion selected from the group consisting of a halogen, an organic anion or an inorganic anion. Non-limiting examples of suitable halogen anions include bromide, chloride, and iodide. Non-limiting examples of suitable organic anions include sulfonylimides and carboxylates, e.g., bis(trifluoromethylsulfonyl)imide, bis(fluorosulfonyl)imide, acetate, propionate, pentanoate, hexanoate. Non-limiting examples of suitable inorganic anions include fluorinated phosphates, e.g., hexafluorophosphate, tris(pentafluoro)trifluorophosphate.

The ionic liquid may additionally comprise any suitable cation, e.g., a cation selected from the group consisting of alkyl-substituted heterocyclics, alkyl-substituted phosphonium cations and alkyl-substituted ammonium cations, where the alkyl group may be any unsaturated, saturated, linear, branched, cyclic non-aromatic, or aromatic $C_1$ to $C_{12}$ alkyl group or any unsaturated, saturated, linear, branched, cyclic non-aromatic, or aromatic optionally substituted $C_1$ to $C_{12}$ alkyl group, e.g., an ether substituted $C_1$ to $C_{12}$ alkyl group. Non-limiting examples of suitable alkyl-substituted heterocyclics cations include: alkylpyridinium cations, e.g., 1-butylpyridinium, 1-octylpyridinium and 1-(2-hydroxyethyl)pyridinium; dialkylimidazolium cations, e.g., 1-ethyl-3-methylimidazolium, 1-butyl-3-methylimidazolium, 1-pentyl-3-methylimidazolium, 1-hexyl-3-methylimidazolium, 1-(2-methoxyethyl)-3-methylimidazolium, 1-methyl-3-octylimidazolium, and 1-(1-methoxymethyl)-3-methylimidazoliura; and dialkylpyrrolidinium cations, e.g., 1-methyl-1-ethylpyrolidinium, 1-methyl-1-butylpyrrolidinium, 1-methyl-1-hexylpyrolidinium, 1-(2-methoxyethyl)-1-methylpyrrolidinium and 1-(1-methoxymethyl)-1-methylpyrrolidinium. Non-limiting examples of suitable alkyl-substituted phosphonium cations include: tetraalkylphosphonium cations, e.g., tetrabutylphosphonium, tributyloctylphosphonium, tributyl(2-methoxyethyl)phosphonium, tributyl-tert-butylphosphonium and tributyl(1-methoxymethyl)phosphonium; and tetraalkylammonium cations, e.g., tetraethylammonium, tetrabutylammonium, tributyloctylammonium, tributyl(2-methoxyethyl)ammonium, tributyl(1-methoxymethyl)ammonium and tributyl-tert-butylammonium.

In one embodiment, the invention provides a polymer matrix comprising a POSS of the invention. In some embodiments of the invention, the polymer matrix comprises one or more of polyethyleneglycol (PEG), polyethylene oxide (PEO), acrylates, diacrylates, methacrylates or dimethacrylates monomers, and the like. The monomers may possess any functional group suitable for polymerization, as understood by those of skill in the art. Exemplary monomers may include PEG acrylates and bis-acrylates or PEG methacrylates and bis-methacrylates. In some embodiments, compositions comprising a polymer may be used as solid or soft-solid electrolytes. In one embodiment, the composition comprising a polymer is used as liquid electrolyte.

In one aspect, the invention provides a liquid electrolyte comprising a polyoligomeric silsesquioxane of Formula (I) and a solvent. For example, in one embodiment, the liquid electrolyte can comprise arrays of disorders particles of compounds of Formula (I) and an aprotic solvent. In one embodiment, the solvent is a polyether solvent, such as tetraglyme. In one embodiment, the liquid electrolyte can serve as a single ion conductor, such as in a lithium ion battery.

In one embodiment, the aprotic solvent comprises a polymerizable group. Accordingly, in one embodiment, the aprotic solvent comprising a polymerizable group is polymerized to form a solid polymer electrolyte.

In one embodiment, the aprotic solvent further comprises a gelation agent. Exemplary gelation agents include, but are not limited to carboxymethyl cellulose (CMC), methyl cellulose, ethyl cellulose, hydroxymethyl cellulose, hydroxypropyl methyl cellulose, and hydroxyethyl methyl cellulose; polycarboxylic acid compounds such as polyacrylic acid and sodium polyacrylate; compounds having a vinyl pyrrolidone structure, such as polyvinyl pyrrolidone; polyacrylamide, polyethylene oxide, polyvinyl alcohol, sodium alginate, xanthan gum, carrageenan, guar gum, agar, starch, and the like In one embodiment, the invention provides a battery comprising a POSS of the invention. In one embodiment, the battery of the invention comprises a liquid electrolyte comprising a POSS of the invention. The battery of the invention includes lithium ion batteries, lithium metal batteries, lithium air and lithium sulfur batteries, as well as sodium and magnesium batteries.

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the protective layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate).

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium, magnesium, or lithium in the negative electrode, as well as other cell elements are protected.

Methods of Making

In another aspect, the invention relates to a method for making a composition comprising a compound of Formula (I), $[(O_{1.5})Si-L-X]_nLi_n$, and a polyether solvent. In one embodiment, the method includes the step of mixing the compound of Formula (I) with the compound of formula $[(O_{1.5})Si-L-X]_nLi_n$ under an inert atmosphere. In one embodiment, the method further comprises adding an additional lithium salt. In one embodiment, the amounts of polyether, polyoligomeric silsesquioxane, and, optionally, additional lithium salt added are calculated to result in an O/Li ratio of between about 20/1 and about 9.7/1. In one embodiment, the amounts of polyether, polyoligomeric silsesquioxane, and, optionally, additional lithium salt added are calculated to result in an O/Li ratio of about 17.1/1.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1: An Alternative Route to Single Ion Conductivity: Self-Assembly of Multi-Ionic Salts Bis(trifluoromethane) sulfonamide lithium salt (LiTFSI) and tetraglyme ($G_4$) (Sigma Aldrich) were dried at 60° C. in vacuo, and $G_4$ further dried over molecular sieves in an argon purged glove box. Lithium metal (Alfa-Aesar) was stored in a desiccator inside an argon purged glove box. Octasilane POSS (SH1310) was a gift from Hybrid Plastics, Inc. and used as received. All the starting materials for synthesis of the salt were purchased from Sigma-Aldrich and used as received.

Figure 8:
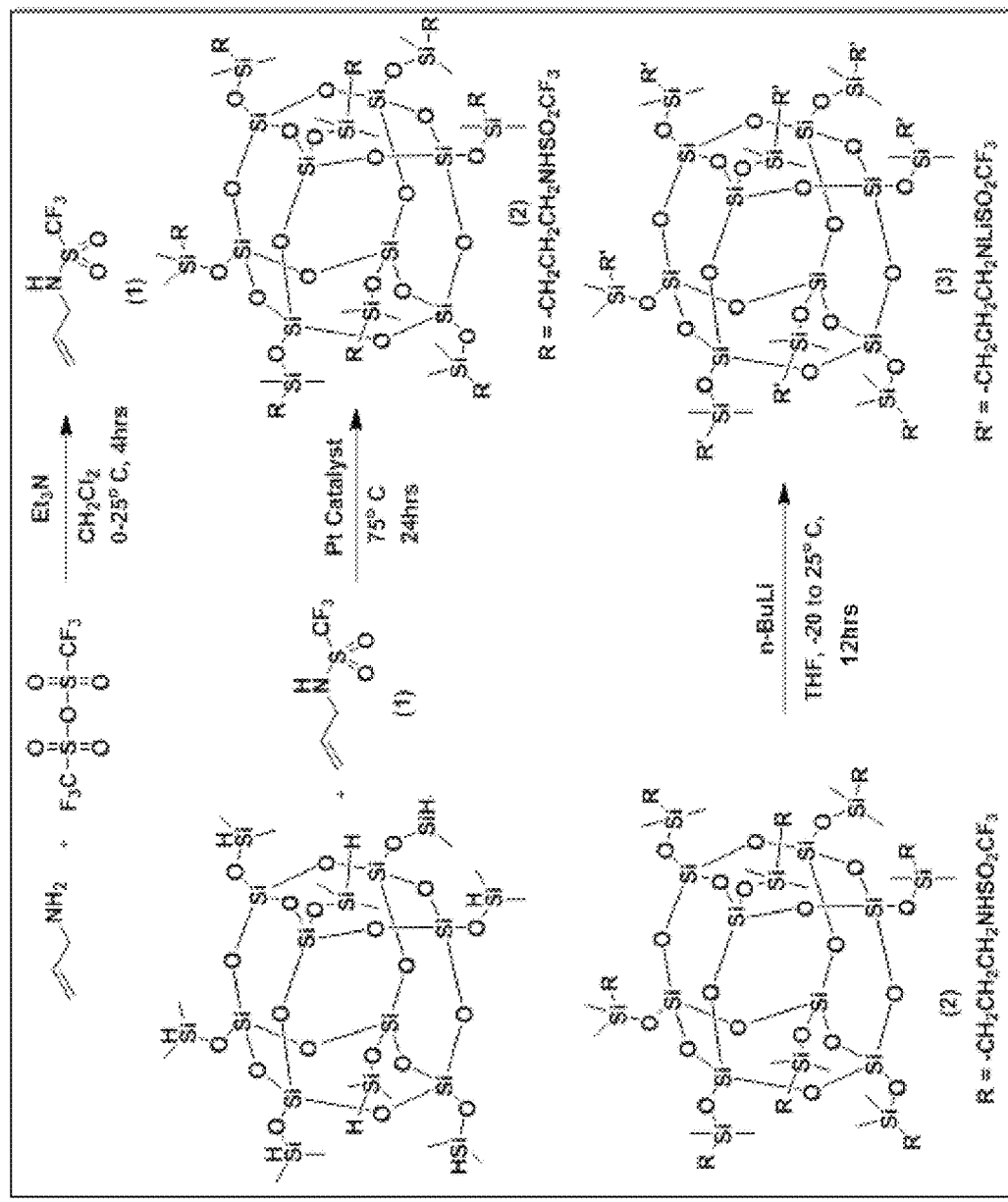
FIG. 8 is synthetic scheme for exemplary compound POSS-(LiTFSI)$_8$.

Synthesis of POSS-(LiTFSI)$_8$=Si$_8$O$_8$[(Si(CH$_3$)$_2$—R)]$_8$ with R=—CH$_2$CH$_2$CH$_2$NLiSO$_2$CF$_3$ is presented in FIG. 8. The details of the synthesis of allyl trifluoromethylsulfonamide (1), the hydrosilylation of allyl trifluoromethylsulfonamide with octasilane POSS to form Si$_8$O$_8$[(Si(CH$_3$)$_2$—R)]$_8$, R=—CH$_2$CH$_2$CH$_2$NHSO$_2$CF$_3$ (2), and the conversion to the lithium salt (3), and their characterization can be found in (Chinnam, Multi-ionic lithium salts for use in solid polymer electrolytes for lithium batteries. Temple University, Philadelphia, Pa., 2015).

Electrolytes were prepared by adding calculated amounts of tetraglyme (G$_4$), POSS-(LiTFSI)$_8$ and/or LiTFSI together in an argon purged MBraun glove box and the mixture stirred overnight at room temperature (RT). The compositions are given in Table 1.

−100° C. to 100° C., with the second heating scans reported. The glass transition temperature, $T_g$, was taken as the midpoint of the heat capacity (Cp) versus temperature plots. Thermogravimetric analysis (TGA) data was obtained on a TA Instruments 2950, scanned from 25 to 800° C. at a rate of 10° C. min$^{-1}$ under N$_2$. Viscosity ($\eta$) of the electrolytes was measured in a B cell ($\eta$ range 2000 cP) in a Rheosense m-VROC viscometer.

Electrochemical Measurements:

Ionic conductivities were measured by AC impedance spectroscopy using a Gamry potentiostat/galvanostat/ZRA (model interface 1000) in the frequency range from 1 Hz to 1 MHz. Control of the equipment was through Gamry framework software and data was analyzed with Gamry Echem analysis software. Temperature dependent conductivities were obtained in a homemade electrochemical cell (1 cm$^2$ stainless steel blocking electrodes) that was thermostatted in the oven of a cryogenic liquid N$_2$ gas chromatograph (GC). The electrochemical cell was placed in the oven of the GC and annealed overnight at 90° C. Conductivity measurements were made on the cooling cycle and heating cycles (the resistances on the heating and cooling cycles were very

TABLE 1

Sample Compositions

| | | | LiTFSI | | | POSS-(LiTFSI)$_8$ | | |
|---|---|---|---|---|---|---|---|---|
| O/Li | G$_4$ g | G$_4$ moles × 10$^{-4}$ | g | moles × 10$^{-4}$ | moles G$_4$ / moles LiTFSI | g | moles 10$^{-4}$ | |
| | | | | | | | | moles G$_4$ / moles POSS |
| 20/1 | 0.150 | 6.75 | 0.048 | 1.67 | 4/1 | 0.054 | 0.2096 | 32/1 |
| 17.5/1 | 0.150 | 6.75 | 0.055 | 1.91 | 3.5/1 | 0.062 | 0.2406 | 28/1 |
| 15/1 | 0.150 | 6.75 | 0.064 | 2.22 | 3.0/1 | 0.072 | 0.2795 | 24/1 |
| 12.5/1 | 0.150 | 6.75 | 0.077 | 2.68 | 2.5/1 | 0.087 | 0.3377 | 20/1 |
| 10/1 | 0.150 | 6.75 | 0.097 | 3.37 | 2.0/1 | 0.1088 | 0.4223 | 16/1 |
| 7.5/1 | 0.150 | 6.75 | 0.129 | 4.49 | 1.5/1 | 0.1448 | 0.5621 | 12/1 |
| 1.5/1 | 0.150 | 6.75 | 0.194 | 6.75 | 1/1 | 0.217 | 0.8423 | 8/1 |
| 2.5 | 0.150 | 6.75 | 0.387 | 13.4 | 0.5 | 0.434 | 1.68 | 4/1 |
| | | | | | | | | wt % LiTFSI/ wt % POSS-(LiTFSI)$_8$ |
| 19.3/1 | 0.150 | 6.75 | 0.00216 | 0.075 | | 0.054 | 0.2096 | 04/96 |
| 16.4/1 | 0.150 | 6.75 | 0.0108 | 0.376 | | 0.054 | 0.2096 | 20/80 |
| 15/1 | 0.150 | 6.75 | 0.0162 | 0.564 | | 0.054 | 0.2096 | 30/70 |
| 18.5/1 | 0.150 | 6.75 | 0.048 | 1.67 | | 0.0048 | 0.0186 | 90/10 |
| 17.1 | 0.150 | 6.75 | 0.048 | 1.67 | | 0.0096 | 0.0372 | 80/20 |
| 8.6/1 | 0.150 | 6.75 | 0.077 | 3.46 | | 0.015 | 0.0582 | 80/20 |
| 16/1 | 0.150 | 6.75 | 0.048 | 1.67 | | 0.0144 | 0.0559 | 70/30 |
| 9.7/1 | 0.150 | 6.75 | 0.064 | 2.88 | | 0.0192 | 0.0745 | 70/30 |

Molecular weights:
G$_4$ 222.28 g/mol;
LiTFSI 287.1 g/mol;
POSS-(LiTFSI)$_8$ 2576 g/mol Characterization: SAXS, TEM DSC, TGA Small angle diffraction data (SAXS) were obtained on a SAXS was performed on a Rigaku S-MAX 3000 SAXS system, courtesy of Christopher Li (Drexel University). Transmission electron microscope (TEM) images were obtained on a JEOL JEM 1400 EM with an operating voltage of 120 keV, and equipped with energy dispersive X-ray analysis (EDX). Differential scanning calorimetry (DSC) was obtained on a TA Instruments Hi-Res DSC 2920 at 10° C. min$^{-1}$ under N$_2$. Except as noted, samples were scanned from 25° C. to 100° C., 100° C. to −100° C. and close) and the heating cycles are reported. At each temperature above RT, the sample was equilibrated for about 30 minutes. Conductivities, $\sigma$ (mS cm$^{-1}$), were obtained using $\sigma=(t/AR)$, where t is the separator thickness in cm, A is the separator cross-sectional area in cm$^2$ and R is the bulk resistance in m$\Omega$.

Interfacial resistance, lithium plating-stripping and lithium ion transport numbers ($t_{Li}^+$) were obtained using the appropriate electrolyte with symmetric non-blocking lithium electrodes at 25° C. The interfacial resistance was measured under open circuit potential as a function of time. The lithium ion transference number was obtained using the modified d.c./a.c., steady-state current method, which contains corrections for slow diffusion coefficients of the ionic species, slow electrode kinetics and passivation films formed on the electrodes (Evans, Polymer 1987, 28, (13), 2324-2328; Bruce, Journal of Electroanalytical Chemistry 1987, 225, (1-2), 1-17; Bruce, Solid State Ionics 1988, 28, 918-922): $t_{Li}^+ = I_{ss}(\Delta V - I_o R_o)/I_o(\Delta V - I_s R_{ss})$ or the same but multiplied by $R_{ss}/R_o$ (however, here $R_{ss} \sim R_o$). A DC pulse ($\Delta V$) of 20 mV was used to polarize the cell, and the initial current, $I_o$, and resistance, $R_o$ and final, steady state, $I_{ss}$, $R_{ss}$ values measured. $I_o$ originates from the migration of both the anions and cations, while $I_{ss}$ is due to the migration of only the cations. Data was fit to the appropriate equivalent circuits using Echem analysis software.

Cyclic voltammetry (CV) and full cell testing, were performed using a Biologic VMP300 and an Arbin BT-G generation battery tester, respectively. Data were obtained using Li/($G_4$/POSS-(LiTFSI)$_8$ O/Li=20/1)/LiFePO$_4$ coin cells. A Celgard™ separator soaked with the $G_4$/POSS-(LiTFSI)$_8$ O/Li=16/1 electrolyte was used. Li$^0$ metal was used as the counter and reference electrodes. The cathode was made with LiFePO$_4$/carbon black/PVDF binder (8/1/1) using N-methyl-2-pyrrolidone (NMP) to form a slurry (~2.4 mg/cm$^2$ LiFePO$_4$) that was doctor-bladed onto battery grade aluminum foil to make 50 micron thick electrodes. The electrodes were dried in vacuo overnight at 120° C. The dried electrodes were rolled with a mechanical presser to make good contact between the electrode and the current collector. Potential sweeps of 0.1 and 0.2 mV/s between 2.25 to 4.2V at 25° C. were used for the CV scans. The current range for the cells was taken based on the theoretical capacity of 170 mAh/g for Li/LiFePO$_4$. The cells were cycled (for full cell tests) at 0.1 C and 25° C. between 2.6 and 4.2V.

Conductivity Data

Low temperature electrochemical impedance spectroscopy (EIS) data consist of depressed semicircles at higher frequencies and slanted lines at lower frequencies. Data were fit using the equivalent circuit consisting of the blocking electrode capacitance in series with a parallel combination of the bulk resistance and capacitance of the electrolyte, with Rb obtained from the intercept of the slanted line extrapolated to the real axis (Bruce, P. G., Polymer Electrolyte Reviews. In MacCallum, J. R.; Vincent, C. A., Eds. Elsevier Applied Science: Amsterdam, 1987; Vol. 1, p 237). At higher temperatures the semicircle disappears as it shifts to higher frequencies due to the increase in temperature of the electrolyte. Conductivity is calculated from =t/AR$_b$, where t (cm), A (cm$^2$), R=membrane thickness, area and resistance ($\Omega$).

The results of the experiments are now described.

Figure 2B:
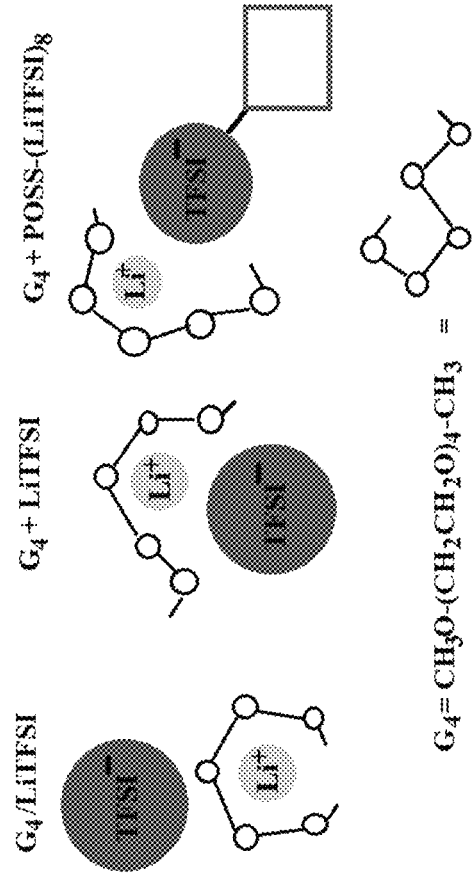

One of the reasons for the low conductivity in polymer SICs is extensive ion aggregation. As in the case of bi-ionic conductors, there are dissociated ions, nonconductive ion pairs and less conductive ion triplets (FIG. 2A). In the case of LiTFSI, ion pair formation is believed to be low. However, for polymer SICs larger ion aggregates also form, as shown schematically in FIG. 2A for a quadrupole. In this case, polymer flexibility adversely affects conductivity by contributing to the ion clustering, since the pendant ion groups have the mobility necessary to phase separate from the more hydrophobic backbone. Confirmation that the formation of these aggregates causes a decrease in ionic conductivity comes from the unexpected finding that addition of a tetraglyme plasticizer to an ionomer results in a reduction of ionic conductivity by 4-5 orders of magnitude (FIG. 2B), as the result of recoupling of the ionic conductivity with the polymer segmental dynamics (Oza, et al., Physical Chemistry Chemical Physics 2016, 18, (28), 19011-19019).

Figure 7:
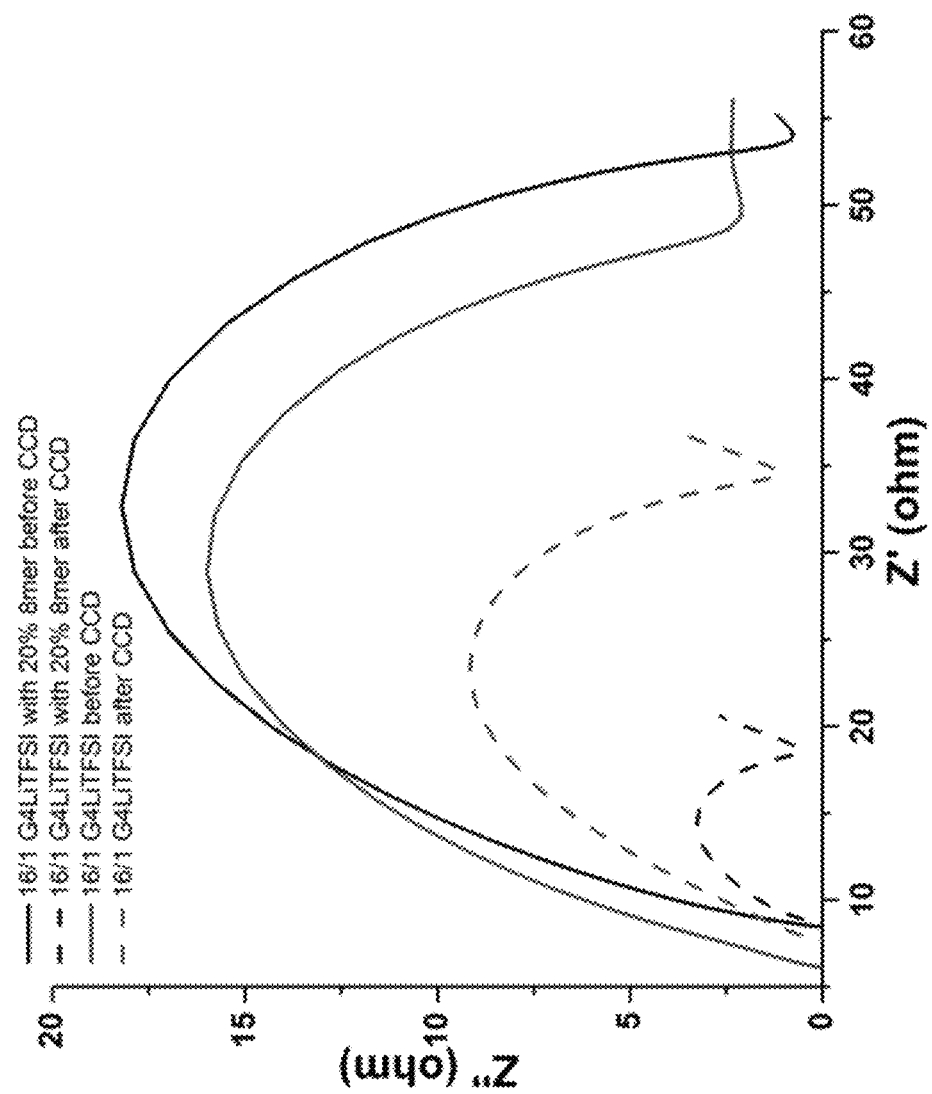
FIG. 7 is a plot of electrochemical impedance spectroscopy (EIS) data of the Li$^0$/(G$_4$/LiTFSI)/Li$^0$ and Li$^0$/[G$_4$/80 wt % LiTFSI/20 wt % POSS-(LiTFSI)$_8$]/Li$^0$ before and after cycling. The data was fit with an equivalent circuit containing the bulk resistance (Rb) in series with the interfacial resistance (Riot) and a constant phase element.

In order to avoid the problem of ion aggregation that reduces conductivity in SICs, the use of symmetric, multi-ionic polyhedral oligomeric silsesquioxane (POSS) (here it can also stand for polyoctahedral silsesquioxane (POSS)) with highly dissociative lithium salts is proposed (FIG. 1A) to impart single ion conductivity and avoid the formation of large ion clusters. The salts are composed of $SiO_{1.5}$ cubes, where the eight corners have been functionalized with LiTFSI-type salts (FIG. 7), and will be referred to as POSS-(LiTFSI)$_8$. When dissolved in aprotic solvents, the large negatively charged POSS-(TFSI$^-$)$_8$ anions repel each other, and it is proposed herein that the rigid $SiO_{1.5}$ cube deters the formation of large aggregates, as shown schematically in FIG. 1B. Since these are symmetric salts, albeit with some flexibility in the group tethering the anion to the cage, the minimum energy configuration should be one with cubic symmetry, so that the POSS-(TFSI$^-$)$_8$ are equally spaced from one another. However, the ~1-2 nm POSS-(TFSI$^-$)$_8$ are much smaller than the >100 nm spheres that are used to form colloidal crystals (Kulkarni and Wunder, Mechanics of Materials 2011, 43, (11), 643-653), so that thermal motion may disrupt this perfect colloidal crystalline structure.

In order to form solid SICs, these salts must be encapsulated in ionogels or dissolved in polymer matrices. Non-flammable ionogels can be formed from ionic liquids (Mantravadi, ACS Appl. Mater. Interfaces 2016, 8, (21), 13426-13436) and POSS-based lithium salts dissolved in ionic liquid (Chinnam, Journal of Materials Chemistry A 2016, 4, (37), 14380-14391), using methyl cellulose (MC) as the gelator. Alternatively, POSS-(LiTFSI)$_8$ can be dissolved in polyethylene glycol (PEG) acrylates, diacrylates, methacrylates or dimethacrylates monomers, and then subsequently polymerized. As a first step towards this approach, mixtures of POSS-(LiTFSI)$_8$ and LiTFSI dissolved in tetraglyme were studied, it was found that $t_{Li}^+ \sim 0.7$ even in the liquid state, with a conductivity of $\sigma > 10^{-3}$.

There has been considerable research on tetraglyme ($G_4$) as an alternative to expensive ionic liquids (ILs). Tetraglyme forms what is called a solvate (or chelate) IL, where a third component (here $G_4$) strongly coordinates Li$^+$, thus forming a complex cation. This has been shown to occur for a 1/1 molar mixture of $G_4$ and LiTFSI, [Li($G_4$)][TFSI] (Pappenfus, Journal of the Electrochemical Society 2004, 151, (2), A209-A215; Tamura Chemistry Letters 2010, 39, (7), 753-755), referred to here as $G_4$/LiTFSI. Ab initio studies (Johansson, Polymer 1999, 40, (15), 4399-4406; Tsuzuki, Physical Chemistry Chemical Physics 2015, 17, (1), 126-129), neutron diffraction (Mao, Physical Review Letters 2000, 84, (24), 5536-5539), thermogravimetric analysis (Tamura Chemistry Letters 2010, 39, (7), 753-755; Yoshida, Journal of Physical Chemistry C 2011, 115, (37), 18384-18394) and NMR (Yoshida, Journal of Physical Chemistry C 2011, 115, (37), 18384-18394; Zhang, Journal of Physical Chemistry C 2014, 118, (31), 17362-17373) data support the formation of this complex, which can persist when incorporated in polymer ionogels (Kido, Electrochimica Acta 2015, 175, 5-12; Kitazawa, Macromolecules 2014, 47, (17), 6009-6016). Since complex formation may not occur for $G_4$/POSS-(LiTFSI)$_8$, $G_4$/POSS-(LiTFSI)$_8$ and $G_4$/LiTFSI were compared based on the ratio of ether oxygens in $G_4$ to Li$^+$ ions (O/Li ratio), as is common in PEO based electrolytes. The preparation and compositions of all the samples, where the weight ratio of POSS-(LiTFSI)$_8$ to LiTFSI varies from 100/0 to 0/100, are given in Table 1.

Figure 3:
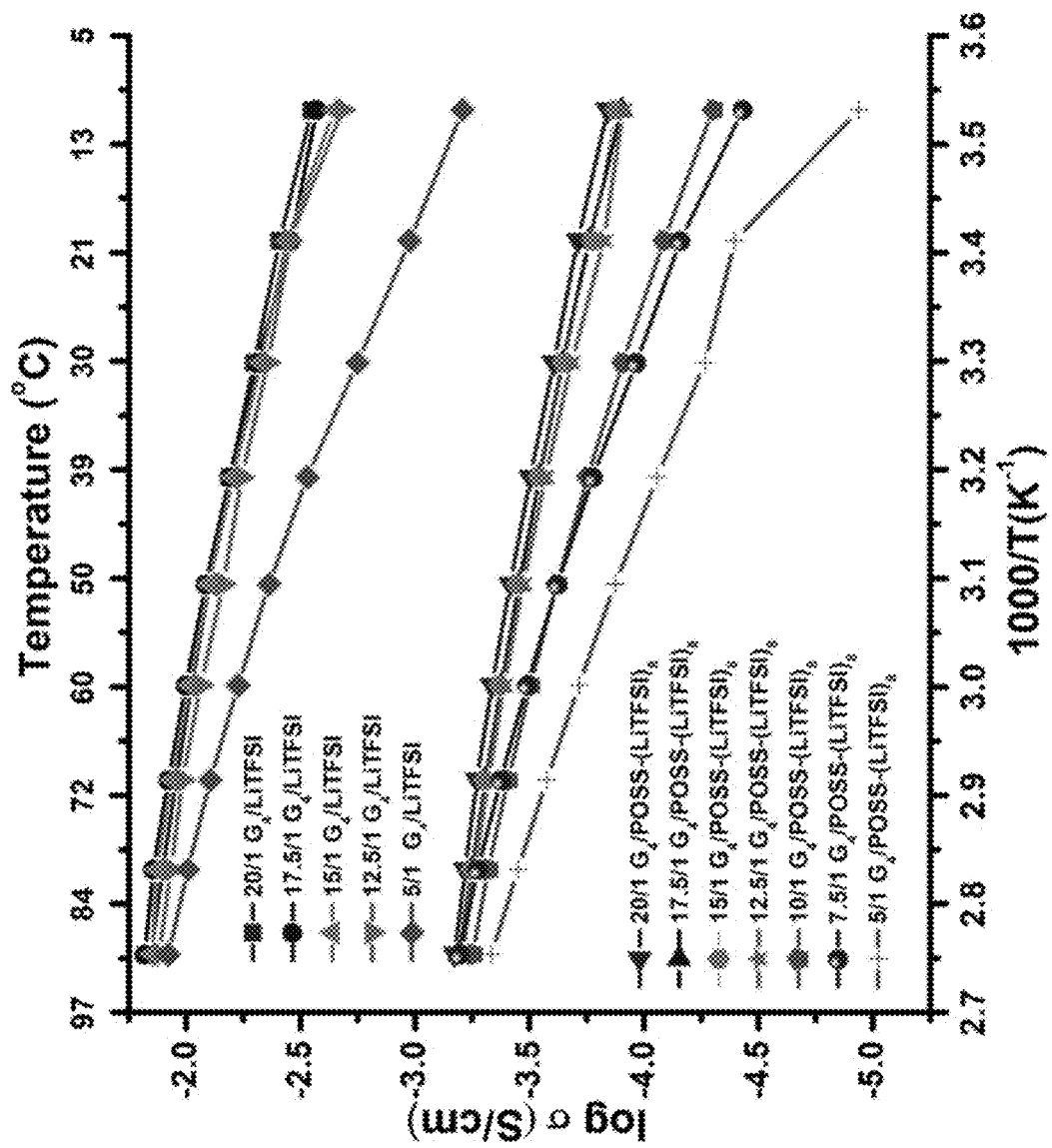
FIG. 3 is a plot of the temperature dependent ionic conductivity as a function of O/Li ratio for G$_4$/LiTFSI and G$_4$/POSS-(LiTFSI)$_8$.

Temperature dependent ionic conductivities of G$_4$/POSS-(LiTFSI)$_8$ and G$_4$/LiTFSI as a function of the ratio of ether oxygens in G$_4$ to Li$^+$ ions, O/Li, (FIG. 3, Table 2) show only an order of magnitude decrease in conductivity of G$_4$/POSS-(LiTFSI)$_8$ compared with that of G$_4$/LiTFSI. This is encouraging, since if the pendant anion were on a polymer SIC, a 2-4 order of magnitude decrease in conductivity is expected. Of further interest is the temperature dependent viscosity of both electrolytes (Table 3), where the viscosity of the G$_4$/POSS-(LiTFSI)$_8$ is only ~35% greater than that of the G$_4$/LiTFSI. This suggests that large scale aggregation does not occur in the G$_4$/POSS-(LiTFSI)$_8$ (which would otherwise result in large viscosity increases). Very little ion pairing has been found in the G$_4$/LiTFSI 1/1 molar ratio electrolyte (Pappenfus, Journal of the Electrochemical Society 2004, 151, (2), A209-A215; Tamura, Chemistry Letters 2010, 39, (7), 753-755), and similar dissociation is expected in the case of G$_4$/POSS-(LiTFSI)$_8$. These results suggest that the difference in conductivity is related to a decreased contribution from the large POSS-(TFSI$^-$)$_8$ anions (2520 g/mol) compared with the TFSI$^-$ anion (215 g/mol), resulting in an increased $t_{Li}^+$ for POSS-(LiTFSI)$_8$. This was confirmed by lithium ion transference number measurements, obtained by electrochemical impedance spectroscopy (EIS), of $t_{Li}^+$=0.65 for G$_4$/POSS-(LiTFSI)$_8$ (O/Li=20/1) versus $t_{Li}^+$=0.45 for G$_4$/LiTFSI (O/Li=20/1) (Table 2). Literature values of $t_{Li}^+$=0.45-0.5 have been calculated for G$_4$/LiTFSI based on self-diffusion coefficients from pulse-field gradient spin-echo (PFGSE)-NMR (and the Nernst-Einstein equation; Yoshida, Journal of Physical Chemistry C 2011, 115, (37), 18384-18394), and measured for G$_4$/LiTFSI in polyethylene oxide (PEO) by the EIS method (Wang, Journal of the Electrochemical Society 2013, 160, (4), A728-A733).

TABLE 2

σ and $t_{Li}^+$ of G$_4$/LiTFSI/POSS-(LiTFSI)$_8$ as a function of composition

| O/Li | G$_4$ + wt % LiTFSI/wt % POSS-(LiTFSI)$_8$ | σ S/cm 30° C. | σ S/cm 90° C. | $t_{Li}^+$ |
|---|---|---|---|---|
| 20/1 | 100/0 | 5.0 × 10$^{-3}$ | 14.3 × 10$^{-3}$ | 0.47, 0.46, 0.44 |
| 17.5/1 | 100/0 | 4.9 × 10$^{-3}$ | 15.0 × 10$^{-3}$ | |
| 18.5/1 | 90/10 | 4.0 × 10$^{-3}$ | 9.1 × 10$^{-3}$ | 0.60, 0.63 |
| 17.1/1 | 80/20 | 3.3 × 10$^{-3}$ | 7.9 × 10$^{-3}$ | 0.71, 0.69, 0.73 |
| 9.7/1 | 70/30 | 3.0 × 10$^{-3}$ | 9.6 × 10$^{-3}$ | 0.61 |
| 16/1 | 70/30 | 3.5 × 10$^{-3}$ | 8.2 × 10$^{-3}$ | 0.65, 0.67 |
| 19.6/1 | 30/70 | 9.3 × 10$^{-4}$ | 2.9 × 10$^{-3}$ | 0.64, 0.65 |
| 16.4/1 | 20/80 | 1.0 × 10$^{-3}$ | 3.0 × 10$^{-3}$ | 0.63, 0.64 |
| 19.3/1 | 4/96 | 3.5 × 10$^{-4}$ | 9.2 × 10$^{-4}$ | |
| 17.5 | 0/100 | 2.3 × 10$^{-4}$ | 6.4 × 10$^{-4}$ | |
| 20/1 | 0/100 | 2.5 × 10$^{-4}$ | 6.7 × 10$^{-4}$ | 0.65, 0.67, 0.69 |

*Since samples were prepared by weight ratios of LiTFSI/POSS-(LiTFSI)$_8$, the O/Li are not all the same; however, conductivities of samples between O/Li = 10/1 to 16/1 do not change much.

TABLE 3

Viscosity of G$_4$, G$_4$/LiTFSI and G$_4$/POSS-(LiTFSI)$_8$ as a function of temperature

| T (° C.) | Viscosity (mPa · s) of tetraglyme (G$_4$), and G$_4$ + salts with O/Li = 20/1 | | |
|---|---|---|---|
| | G$_4$ | G$_4$/LiTFSI | G$_4$/POSS-(LiTFSI)$_8$ |
| 10 | 3.7 | 20.7 | 23.7 |
| 30 | 3.0 | 10.3* | 14.8 |
| 50 | 2.0 | 5.7 | 8.2 |
| 70 | 1.5 | 3.6 | 5.0 |

*Comparable data previously reported[23]

Figure 4:
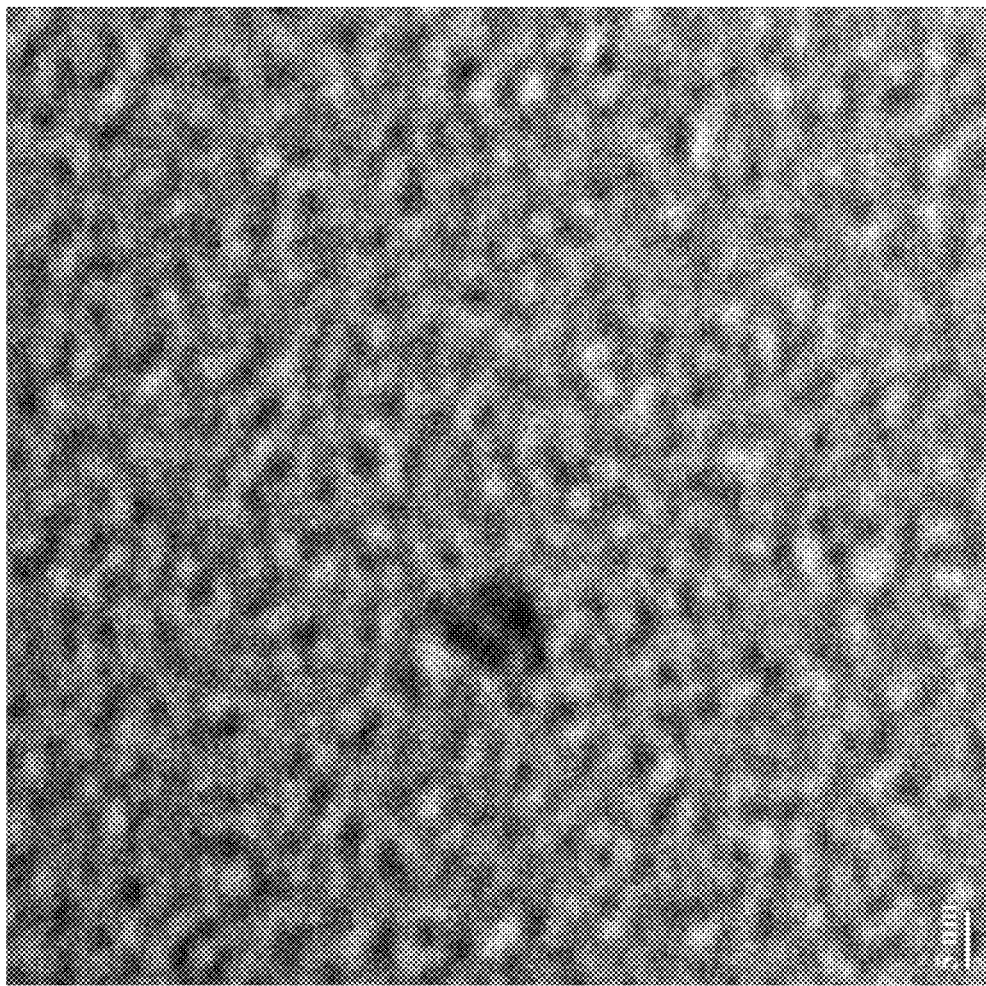
FIG. 4 is a transmission electron microscope (TEM) image of G$_4$/POSS-(LiTFSI)$_8$ with O/Li=5/1.
Figure 9:
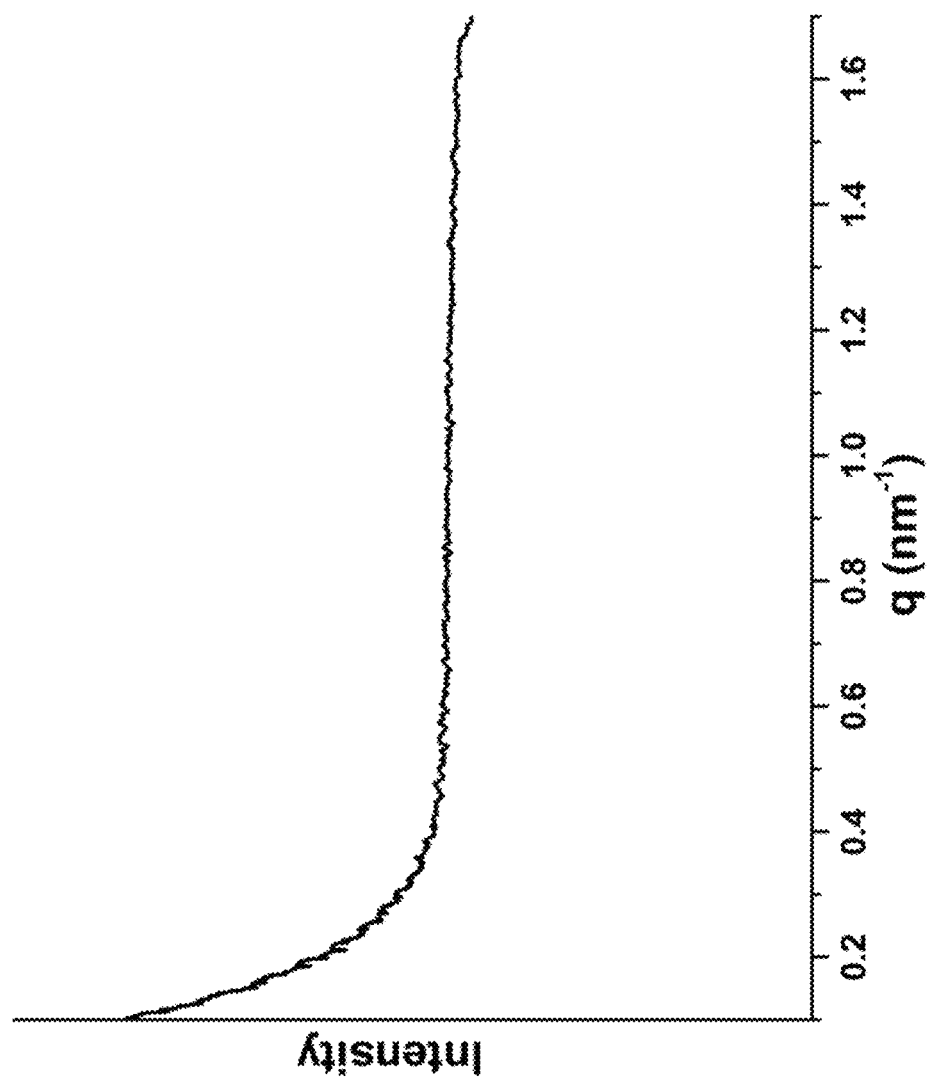
FIG. 9 is plot of small angle diffraction data for exemplary composition G$_4$/POSS-(LiTFSI)$_8$ O/Li=6/1 showing absence of aggregation.
Figure 11B:
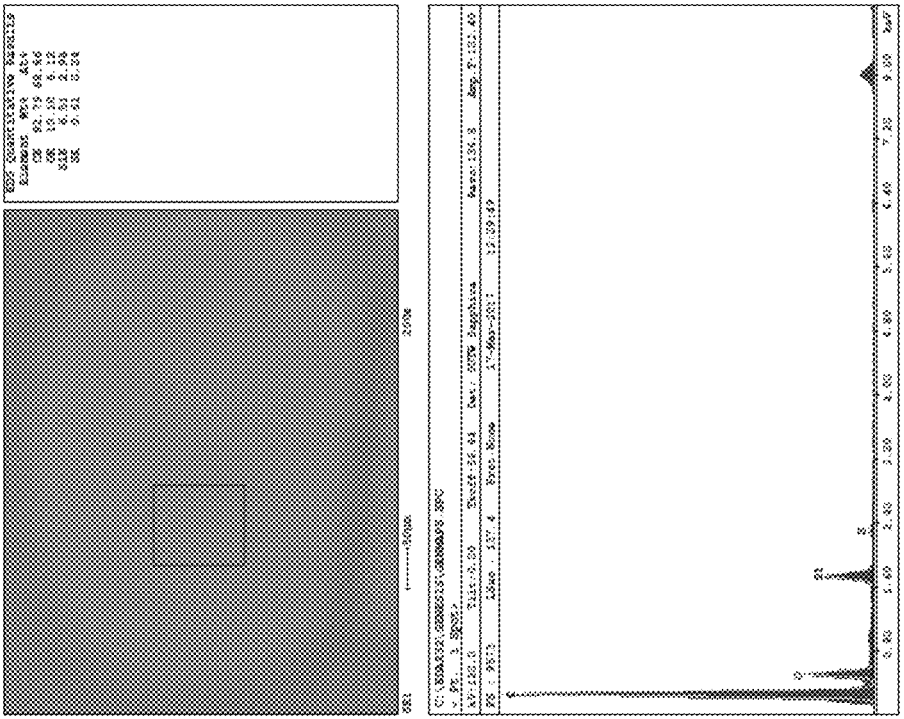
FIGS. 11A and 11B, depicts energy dispersive X-ray (EDX) analysis of the grids presented in FIG. 10.
Figure 11A:
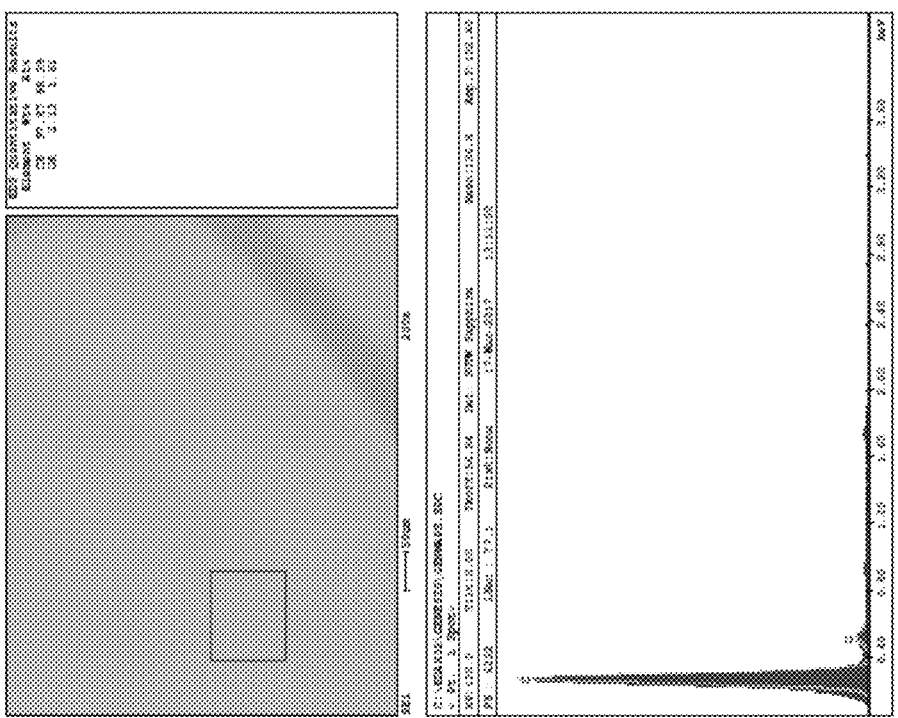
Figure 12:
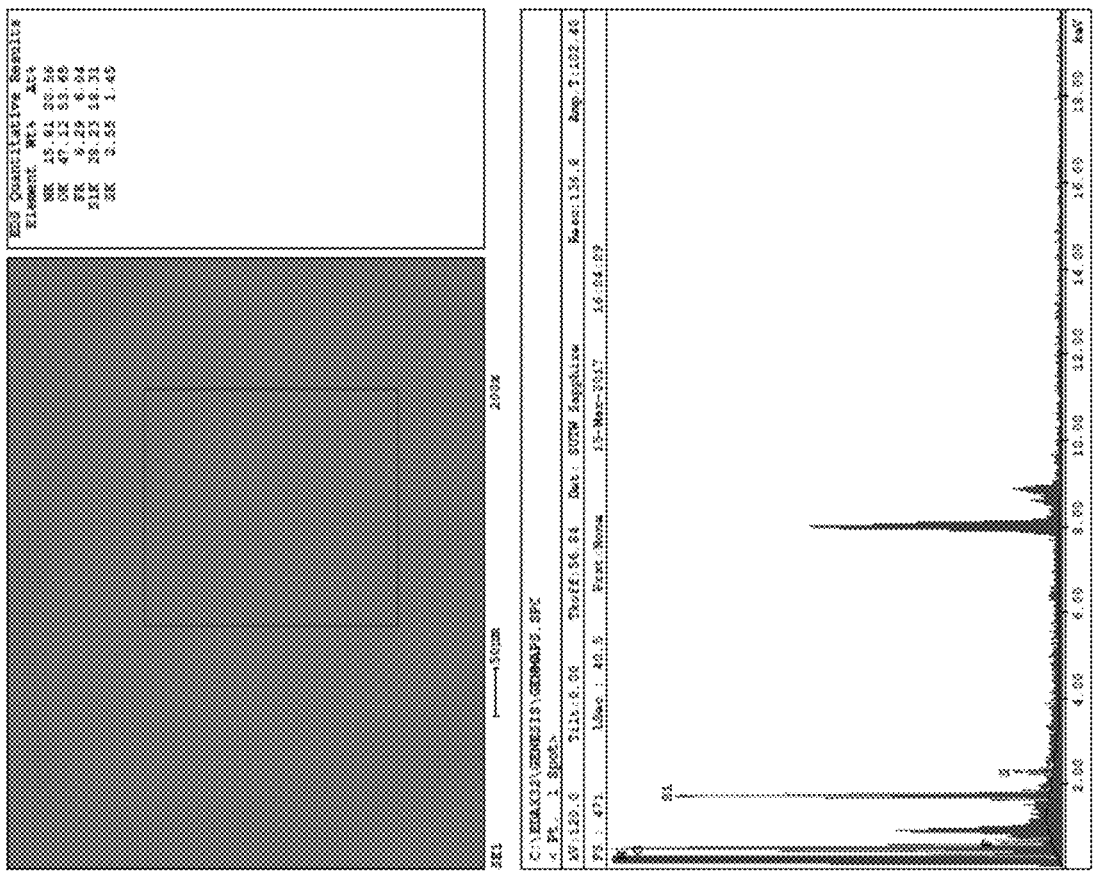
FIG. 12 is a TEM image of a larger spot size of G$_4$/(POSS-LiTFSI)$_8$, 1/1 molar ratio (O/Li=4/1), polymerized in PEGMEA, with EDAX showing Si, F, S and O in the sample.

The absence of aggregation is also suggested by the stability (months) and lack of precipitation of the POSS-(LiTFSI)$_8$, even though the weight of POSS-(LiTFSI)$_8$ is up to 4× greater than the weight of G$_4$ (see Table 1); this absence of aggregation was confirmed by TEM images and X-ray scattering data. The lack of a SAXS scattering peak (FIG. 9) in concentrated samples (O/Li=5/1) indicates the absence of aggregation (Pan, Advanced Materials 2015, 27, (39), 5995-6001). Both G$_4$ and POSS-(LiTFSI)$_8$ exhibit amorphous halos in the WAXS data at 2θ~5-6° and 20-22° (not shown). These scattering halos have been attributed to the inter distance of dispersed POSS (2θ=5.7°, d spacing of 1.5 nm) and amorphous polyethylene oxide (2θ=21.7°, d spacing of 0.41 nm) (Pan, Advanced Materials 2015, 27, (39), 5995-6001). TEM images (FIG. 4) of the O/Li=5/1 sample also did not show signs of aggregation, and individual POSS molecules could be observed, with the distance between the POSS-(LiTFSI)$_8$ about the same order as their size, i.e. ~1.5-3 nm. This is consistent with an estimated volume ratio of G$_4$/POSS-(LiTFSI)$_8$~1.7, assuming volume additivity, a radius of 0.75 nm for POSS-(LiTFSI)$_8$, and a density of 1 mg/mL for G$_4$. Since liquids cannot be used in TEM, a sample with O/Li=5/1 was prepared by dissolving the POSS-(LiTFSI)$_8$ in polyethylene glycol monomethyl ether acrylate (M$_n$=350 g/mol), 0.1% AIBN, and diluted with acetonitrile (ACN). After dropping the solution on a TEM grid, and evaporation of the ACN, the sample polymerized. EDAX data (FIGS. 11 and 12 and S3) confirmed that these images contained the POSS-(LiTFSI)$_8$.

Differential scanning calorimetry (DSC) data (Table 4, FIG. 13) show that G$_4$ melts at T$_m$=-28.3° C. in agreement with literature values (T$_m$=-30° C.; Tamura, Chemistry Letters 2010, 39, (7), 753-755), with no glass transition temperature (T$_g$). For the 1/1 molar complex of G$_4$/LiTFSI, the melt is completely suppressed and T$_g$=-57° C., close to the previously reported values (T$_g$=-54° C.; Tamura, Chemistry Letters 2010, 39, (7), 753-755). No melt peaks were observed except for very small (crystallization and re-melt) peaks in the 20/1 and 17.5/1 samples. The trends in T$_g$ for G$_4$/LiTFSI show an increase in T$_g$ with increasing salt concentration. This increase can be attributed to the effects of increased viscosity and ~CH$_2$CH$_2$O—Li$^+$—OCH$_2$CH$_2$~ crosslinks with increased salt concentration.

TABLE 4

Glass transition ($T_g$s) and melt ($T_g$) temperatures and enthalpies ($\Delta H_m$) for $G_4$/Li salts

| | $G_4$/(POSS-(LiTFSI)$_8$ | | | | $G_4$/LiTFSI | | | |
|---|---|---|---|---|---|---|---|---|
| O/Li | moles $G_4$ / moles POSS | $T_g$ °C. | $T_m$ °C. | $\Delta H_m$* J/g | moles $G_4$ / moles LiTFSI | $T_g$ °C. | $T_m$ °C. | $\Delta H_m$* J/g |
| 100/0 ($G_4$) | | | −28.3 | 126.8 | | | −28.3 | 126.8 |
| 20/1 | 32/1 | −78 | −32.1 | 91 | 4/1 | −98 | −46.9 | 55 |
| 17.5 | 28/1 | −76 | −32.9 | 85 | 3.5 | −94 | −42.9 | 7 |
| 15/1 | 24/1 | −79 | −34.5 | 78 | 3/1 | −91 | — | — |
| 12.5 | 20/1 | −76 | −36.5 | 70 | 2.5/1 | −87 | — | — |
| 10/1 | 16/1 | −92 | −38.8 | 36 | 2/1 | −83 | — | — |
| 7.5/1 | 12/1 | −85 | N/A | N/A | 1.5/1 | −76 | — | — |
| 5/1 | 8/1 | −74 | N/A | N/A | 1/1 | −57 | — | — |
| 2.5/1 | 4/1 | −64 | N/A | N/A | 0.5/1 | −38 | — | — |

Mixed $G_4$/LiTFSI/(POSS-(LiTFSI)$_8$

| | wt % POSS-(LiTFSI)$_8$/ wt % LiTFSI | | | | | | | |
|---|---|---|---|---|---|---|---|---|
| 19.3/1 | 04/96 | | | | | | | |
| 16.4/1 | 20/80 | −81 | −36.3 | 69 | | | | |
| 15/1 | 30/70 | −91 | −40.2 | 44 | | | | |
| 9.7/1 | 70/30 | −90 | N/A | N/A | | | | |
| 16/1 | 70/30 | −95 | −49 | 29 | | | | |
| 17.1/1 | 80/20 | −97 | −47 | 36 | | | | |
| 18.5/1 | 90/10 | −97 | −46 | 47 | | | | |
| 17.1/1 | 80/20 | −97 | −47 | 36 | | | | |

*$\Delta H_m$ is normalized for the amount of $G_4$

For $G_4$/POSS-(LiTFSI)$_8$, the melt temperature $T_m$ and melt endotherm $\Delta H_m$ decrease with increasing POSS-(LiTFSI)$_8$, but only completely disappear at O/Li=7.5/1 and 5/1 (there is a very small crystallization and re-melt at O/Li=10/1). These results reflect the high concentration of charge for the more localized (8) negative charges on the one POSS-(TFSI$^-$)$_8$ anion, compared with the (8) dispersed anions for LiTFSI. The Li$^+$ ions will tend to migrate towards the POSS-(TFSI$^-$)$_8$ to shield their large negative charge. Since Li$^+$ ions are typically solvated by a combination of 4-5 ether oxygens and/or anion contacts, in the case of $G_4$/POSS-(LiTFSI)$_8$, more of these contacts may come from contact ion pairs than from ether oxygen than in the case of $G_4$/LiTFSI, where the Li$^+$ ions can be completely solvated by $G_4$ (FIG. 2). This would leave more $G_4$ molecules available for crystallization in the case of $G_4$/POSS-(LiTFSI)$_8$ compared with $G_4$/LiTFSI, as observed. Interestingly, at O/Li ratios (10/1, 7.5/1, 5/1, 2.5/1) for which $G_4$/(POSS-(LiTFSI)$_8$ and $G_4$/LiTFSI are both amorphous (or nearly so), $T_g$ for $G_4$/(POSS-(LiTFSI)$_8$ is ~10° C. less than for $G_4$/LiTFSI at equivalent O/Li ratios. This behavior may arise from the closer association of Li$^+$ with $G_4$ in $G_4$/LiTFSI raising its $T_g$, while in $G_4$/(POSS-(LiTFSI)$_8$ the Li$^+$ ion may also interact with the negative charges on POSS-(TFSI$^-$)$_8$.

For $G_4$/POSS-(LiTFSI)$_8$, $T_g$ is almost constant at ~−77° C. for the samples that have some crystallinity, and this value can be partially attributed to constraints imposed by the chains between crystallites. More importantly, the $G_4$ crystals exclude POSS-(LiTFSI)$_8$, so that the amorphous phase has a higher effective O/Li ratio, raising $T_g$. However, when the $G_4$/(POSS-(LiTFSI)$_8$ is completely amorphous, $T_g$ decreases, and as in the case of $G_4$/LiTFSI, $T_g$ increases with increasing salt concentration as expected. In addition, the ionic conductivities are almost the same for all temperatures (FIG. 3) for $G_4$/POSS-(LiTFSI)$_8$ with O/Li=10/1, 12/1, 14/1 and 16/1, which have similar values of $T_g$~−77 (Table 4).

Figure 5:
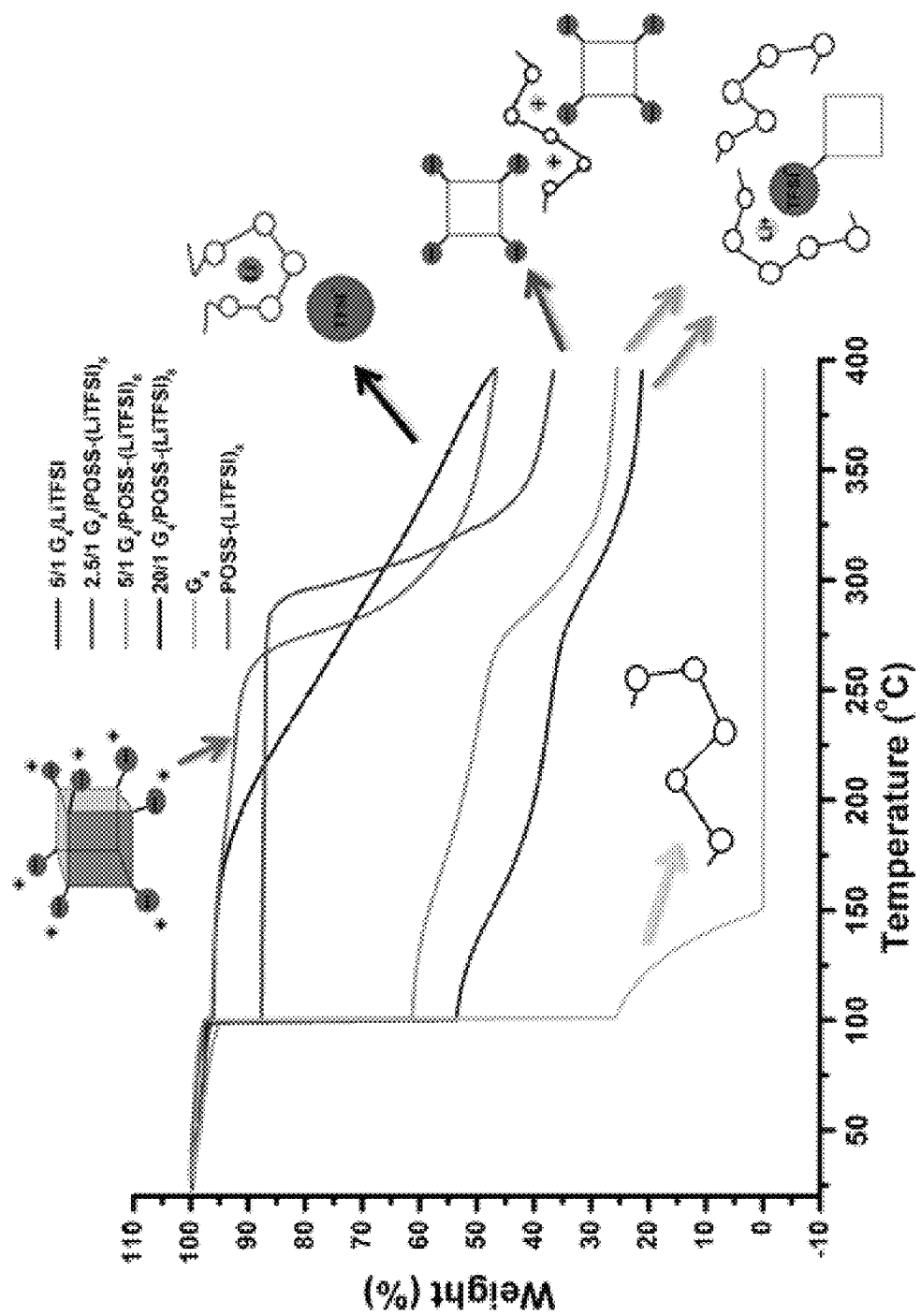
FIG. 5 is a plot of thermogravimetric analysis weight loss data of exemplary compositions. The samples heated to 100° C. (at 10° C./min), held at that temperature for 1 h, and then heated to 400° C. at 10° C./min.
Figure 13A:
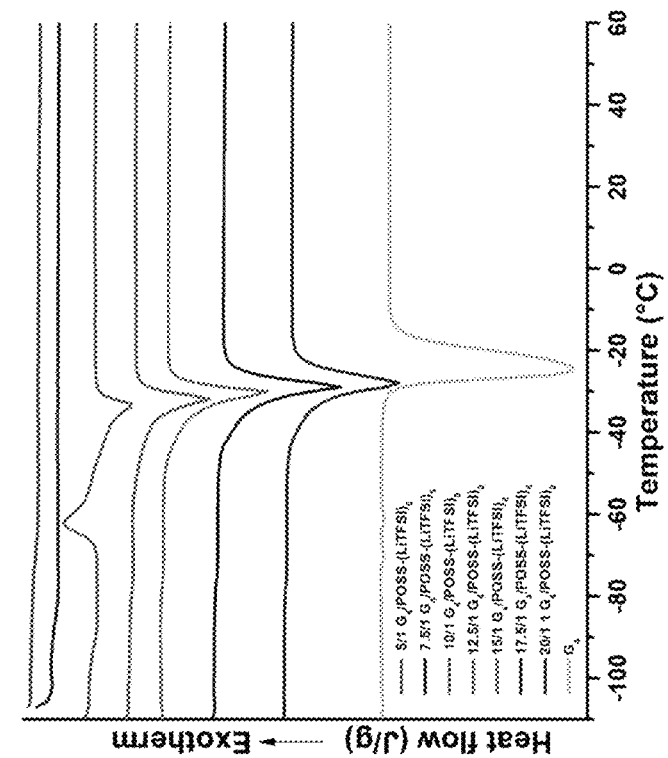
FIGS. 13A and 13B, depicts differential scanning calorimetry (DSC) thermograms of exemplary compositions at different O/Li ratios.
Figure 13B:
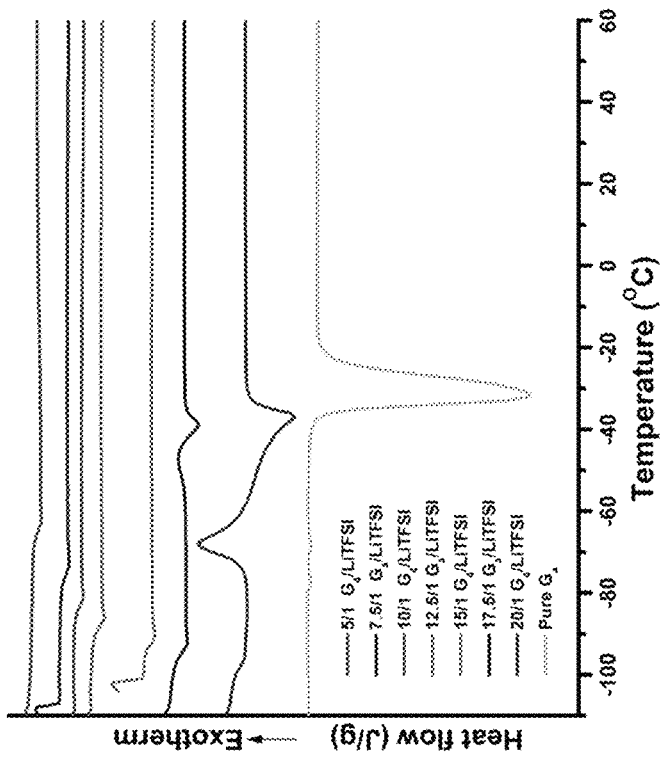
Figure 14:
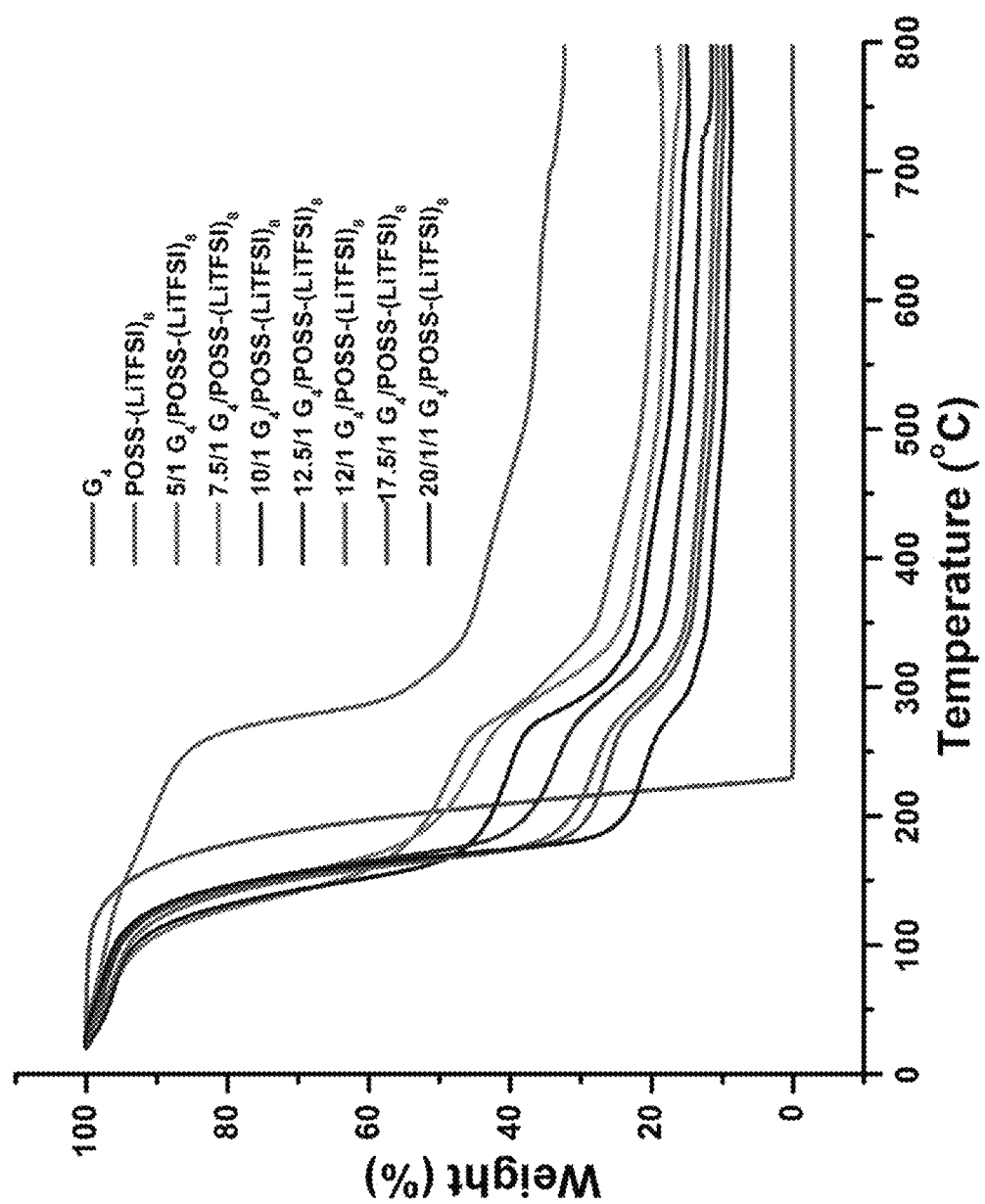
FIG. 14 is a plot of thermogravimetric analysis (TGA) data for G$_4$ and POSS-(LiTFSI)$_8$ and their mixtures as a function of O/Li ratio. The degradation temperature (T$_d$), which occurs at T$_d$~150° C., is determined by T$_d$ of G$_4$ (boiling point T$_b$=275° C.). Since POSS-(LiTFSI)$_8$ has a residual mass of ~40 wt %, the weight loss of the mixtures decreases as the amount of POSS-(LiTFSI)$_8$ increases.

These results suggest that although the both salts contain TFSI$^-$ or TFSI-like anions, the interactions of Li$^+$ with $G_4$ are not the same at comparable O/Li ratios below or above the $G_4$ melt temperature. Thermogravimetric analysis (TGA) data provide information on the complex formed between the Li$^+$ cation and $G_4$ (FIG. 13). It has been shown that for $G_4$/LiTFSI, a 1/1 molar complex (which is O/Li=5/1 since there are 4 ether oxygens/$G_4$) has different thermal behavior than mixtures where there is excess $G_4$ (FIG. 2). In particular, in isothermal TGA studies at 100° C., there is no loss of TGA with time (for at least 1-2 h) at this temperature, and the $G_4$ is removed at 200° C. (Yoshida, *Journal of Physical Chemistry C* 2011, 115, (37), 18384-18394). In the case of pure $G_4$, or when excess $G_4$ is present, $G_4$ is continually removed at 100° C. In the case of $G_4$/POSS-(LiTFSI)$_8$, since there are 8 Li$^+$ ions/molecule, this corresponds to an 8/1 $G_4$/POSS-(LiTFSI)$_8$ molar ratio (also O/Li=5/1). However, for this composition, as well as for compositions with excess $G_4$, there is continual weight loss in the TGA at 100° C. (FIG. 5). The TGA data therefore indicates that for the $G_4$/POSS-(LiTFSI)$_8$ (8/1 mole ratio, O/Li=5/1) the Li$^+$/$G_4$ complex is not formed. Instead, the Li$^+$ ion is more loosely complexed with the $G_4$, and possibly also interacting with the TFSI$^-$ anions of POSS-(TFSI$^-$)$_8$. The only composition where the weight loss is delayed is for $G_4$/POSS-(LiTFSI)$_8$ (4/1 mole ratio, O/Li=2.5/1), and here the $G_4$ comes off predominantly at 300° C., at an even higher temperature than the pure POSS-(LiTFSI)$_8$. In this case, the $G_4$ is even more tightly complexed than for the $G_4$/LiTFSI (1/1 molar ratio), which is removed at 200° C. This arises since one $G_4$ must be shared between two Li$^+$ of $G_4$/POSS-(LiTFSI)$_8$, and since the Li$^+$ ions need to shield the large negative charge of the G$_4$/POSS-(LiTFSI)$_8$, the G$_4$ is trapped between the cubes, as shown in a 2D representation (FIG. 5). For this composition, again assuming that the radius of POSS-(LiTFSI)$_8$ is ~0.75 nm, that the density of G$_4$ is ~1 mg/mL, and that volumes are additive, there are approximately equal volumes of G$_4$ and POSS-(LiTFSI)$_8$. The fact that this composition remains stable strongly suggests that there is an ordered arrangement of the POSS-(LiTFSI)$_8$.

Figure 15:
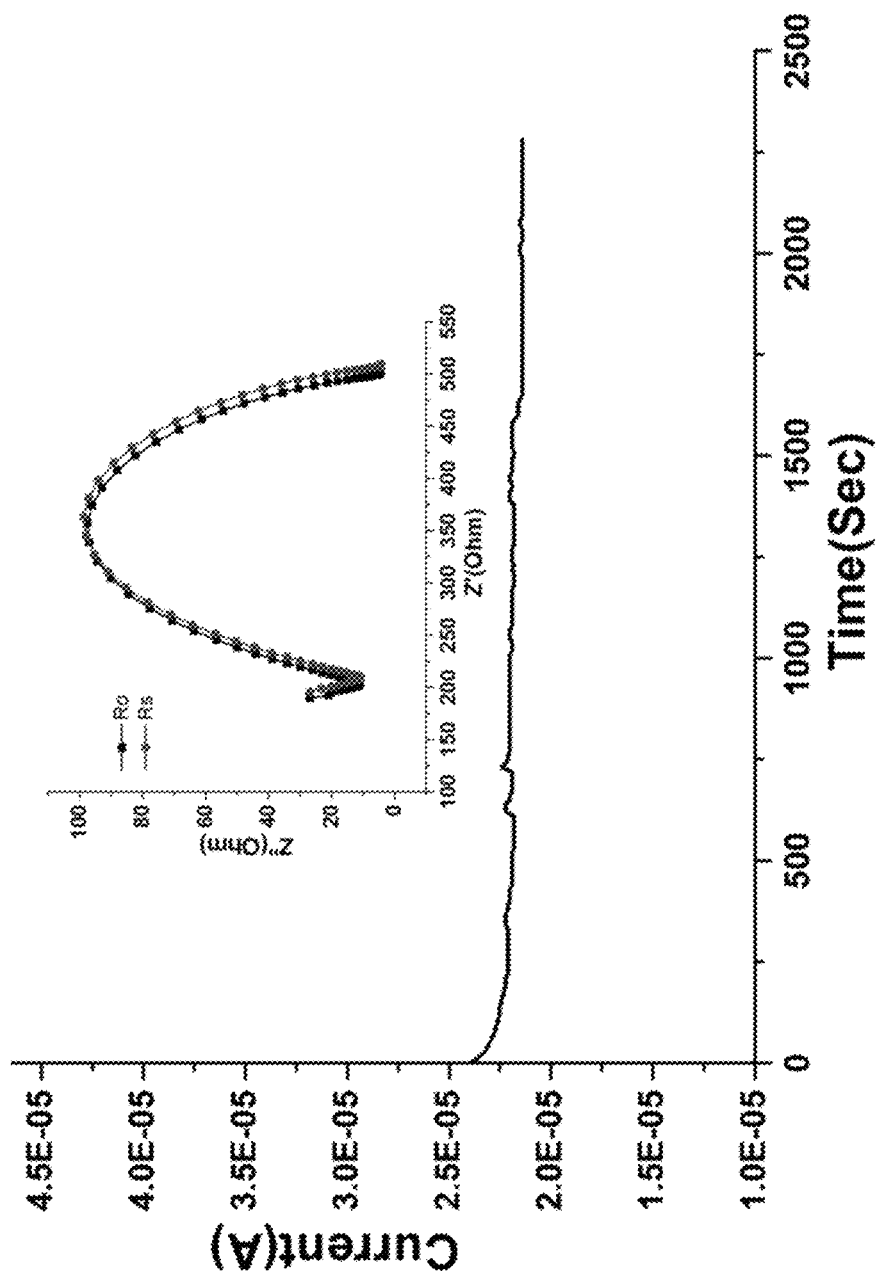
FIG. 15 is a plot of current (I) versus time for Li$^0$/[G$_4$/POSS-(LiTFSI)$_8$]/Li$^0$ cell using ΔV=20 mV at 25° C. Inset shows impedance (Z" vs Z') of cell taken before (R$_O$) and after (R$_s$) polarization; t$_{Li}^+$=0.65.

LiTFSI was then added to G$_4$/POSS-(LiTFSI)$_8$, in order to determine whether the proposed ordered array of POSS-(LiTFSI)$_8$, and the high $t_{Li}{}^+$, could be maintained while the ionic conductivity was increased due to the contribution of the more conductive LiTFSI. The ionic conductivity does increase with added LiTFSI as expected (Table 2), and $t_{Li}{}^+$ remains the same (average value <0.65>) as for neat G$_4$/POSS-(LiTFSI)$_8$ for samples with greater than 10 wt % POSS-(LiTFSI)$_8$ (FIG. 15). This is a remarkably high combination of lithium ion transference number ($t_{Li}{}^+$>0.65) and conductivity ($\sigma$>10$^{-3}$ S/cm at 25° C.) for a liquid sample. These values may result from of an array of POSS-(TFSI$^-$)$_8$ anions that repel each other due to their high charge densities, creating a tortuous channel path with negatively charged "walls". With the addition of mobile TFSI$^-$ and Li$^+$ ions, the surface charge density of the "walls" defined by the POSS-(TFSI$^-$)$_8$ array will be greater than that of the bulk solution, and the Li$^+$ ions will tend to shield this negative charge. If the pore dimensions are comparable to the Debye screening length, the mobile TFSI$^-$ anions will be screened from migrating through the channels under a potential gradient (Vlassiouk, Nano Letters 2008, 8, (7), 1978-1985), while the Li$^+$ ions will have unhindered mobility.

The idea of using nanoporous tortuous paths formed in nanoparticle suspensions at particle loadings above a critical value at which a jamming (or glass) transition occurs, has previously been investigated for polymers/oligomers (Schaefer, Journal of Materials Chemistry 2011, 21, (27), 10094-10101) or ionic liquids (Lu, Journal of Materials Chemistry 2012, 22, (9), 4066-4072) tethered to SiO$_2$ nanoparticles (~7-10 nm). Although these steric barriers did not hinder transport of bulky TFSI$^-$ anions (so that $t_{Li}{}^+$<0.5), the attachment of both polyethylene glycol and ionic groups (SiO$_2$—SO$_3$BF$_3$Li) to the SiO$_2$ nanoparticles increased $t_{Li}{}^+$ to 0.6 to 0.9, but with conductivities ≤10$^{-4}$ S/cm, when dispersed in tetraglyme (Schaefer, Chemistry of Materials 2013, 25, (6), 834-839).

In addition, molecular dynamic simulations (MDS) indicate that the coordinated hopping of Li$^+$ between ion pairs (or higher order) clusters (Lu, Soft Matter 2016, 12, (17), 3943-3954) is a possible Li$^+$ ion diffusion mechanism. Here, since larger aggregates, which kinetically trap the Li$^+$ cations, do not occur, it is possible that the morphology is ideal for hopping of Li$^+$ ions between POSS-(TFSI$^-$) . . . Li$^+$ . . . TFSI$^-$ triplets.

Figure 6:
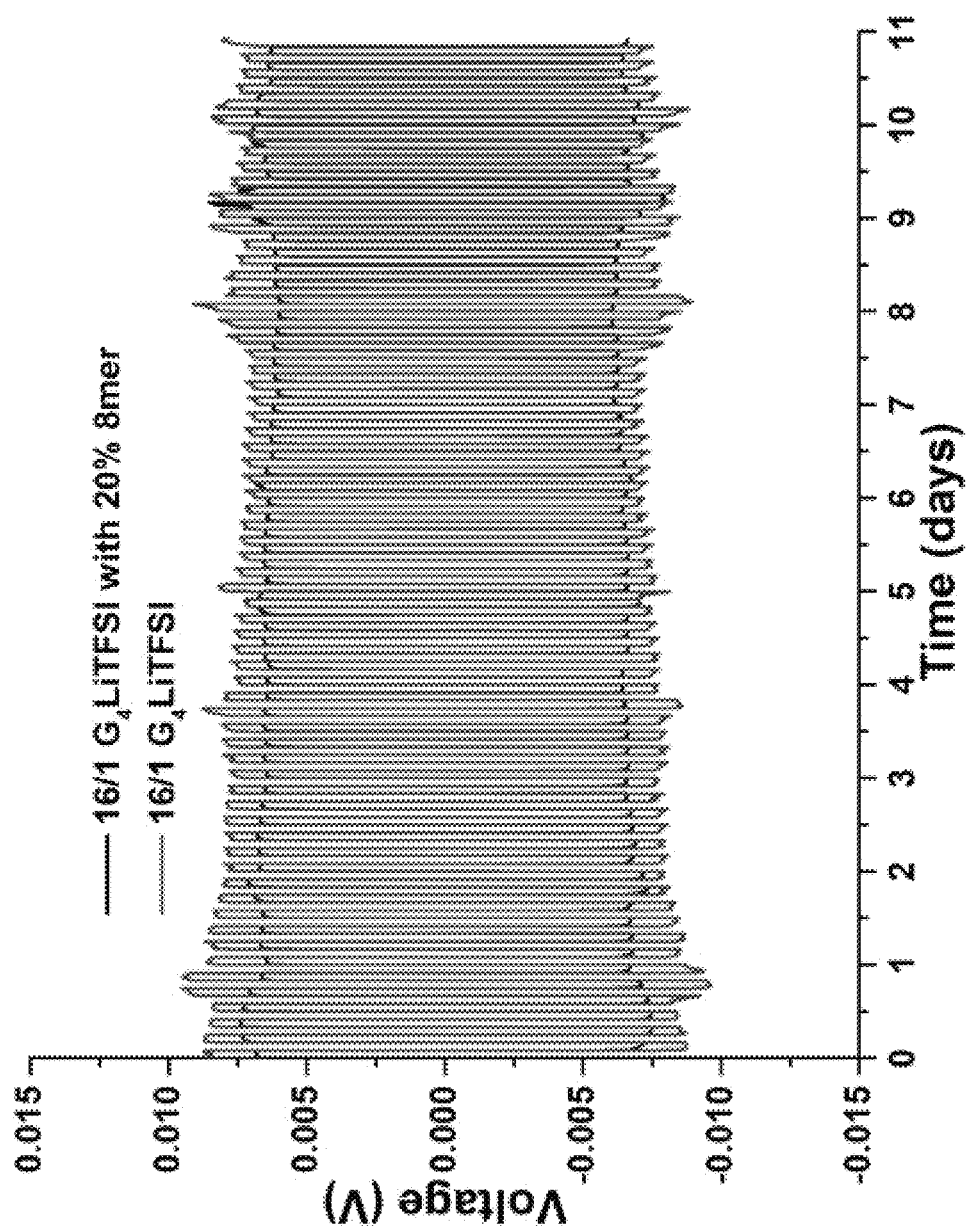
FIG. 6 is plot of a comparison of cycling data using 0.1 mA/cm$^2$ and 2 h charge/2 h discharge, for Li$^0$/(G$_4$/LiTFSI)/Li$^0$ and Li$^0$/[G$_4$/80 wt % LiTFSI/20 wt % POSS-(LiTFSI)$_8$]/Li$^0$. Note: O/Li=16/1 and 14/1, respectively.
Figure 17:
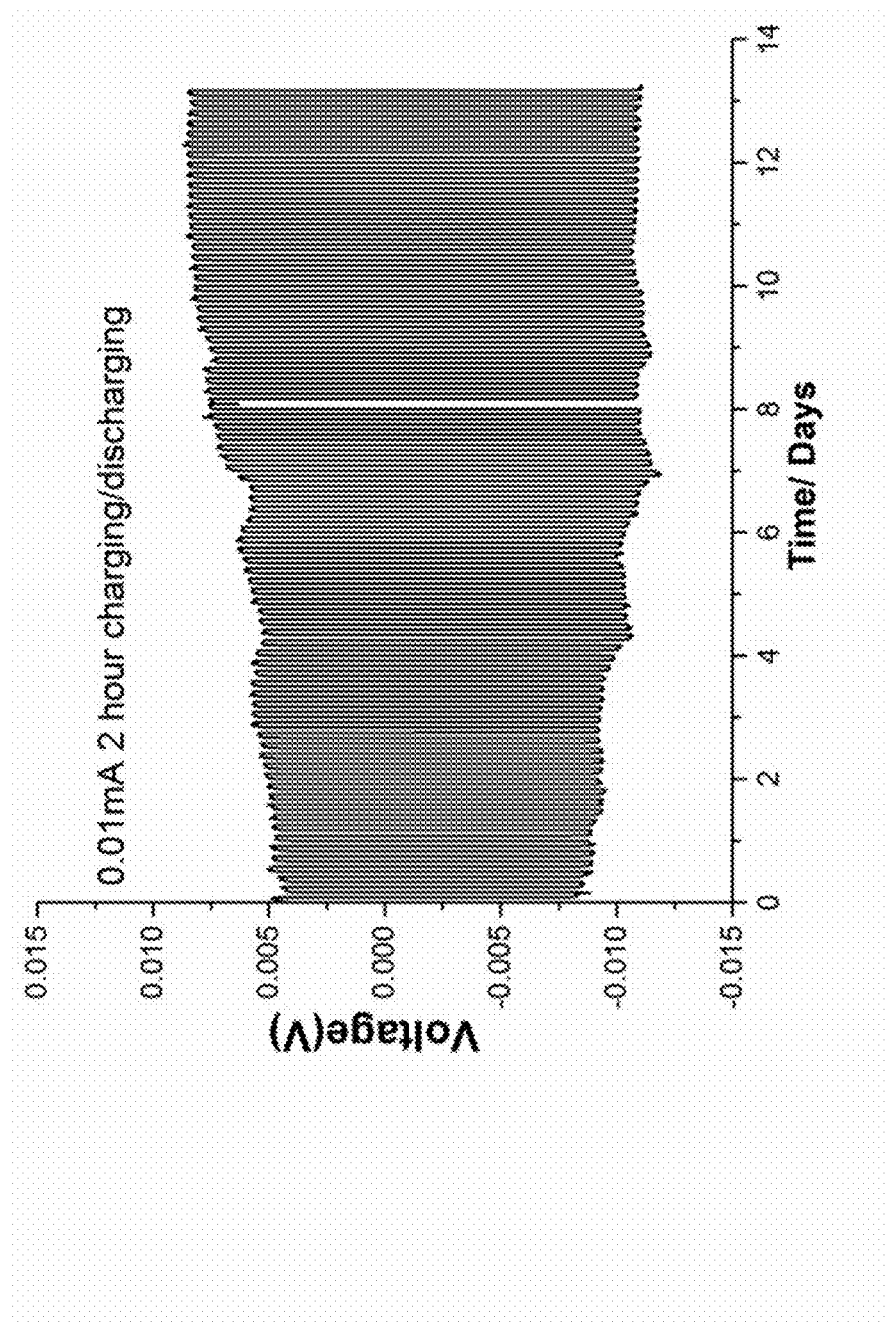
FIG. 17 depicts the Li$^0$/Li$^0$ cycling for G$_4$/POSS-(LiTFSI)$_8$ at O/Li=20/1 using 2 h charge/discharge and I=0.01 mA/cm$^2$. This is almost the same current that is used in the full cell at C/10 rate. Minor changes in the over voltage with time are due to the expected growth and consolidation of SEI at the lithium surface upon lithium plating and stripping. With I=1 mA/cm$^2$, the cell shorts in ~24 hours.

The Li stripping-plating and interfacial resistance of G$_4$/LiTFSI and G$_4$/80 wt % LiTFSI/20 wt % POSS-(LiTFSI)$_8$ were investigated by soaking the electrolyte in glass fibers with 1.6 mm pores. Separators with large pores such as Celgard, and the larger 1.6 mm pores of glass fiber filters (Whatman) used in this investigation, do not prevent dendrites from spanning and thus shorting the cell. The lithium stripping-plating voltage profile data for the G$_4$/LiTFSI and G$_4$/80 wt % LiTFSI/20 wt % POSS-(LiTFSI)$_8$ (FIG. 6) are stable for at least 11 days (at which point the cycling was stopped). There is smaller overvoltage (about 6 mV) for the G$_4$/80 wt % LiTFSI/20 wt % POSS-(LiTFSI)$_8$ compared with G$_4$/LiTFSI (about 8.5 mV) despite the lower bulk resistance (higher conductivity) of G$_4$/LiTFSI, indicating lower interfacial resistance when POSS-(LiTFSI)$_8$ is added to the electrolyte. EIS data (FIG. 7) before and after cycling experiments show that the interfacial resistance was higher before cycling and lower after cycling for G$_4$/80 wt % LiTFSI/20 wt % POSS-(LiTFSI)$_8$ than for G$_4$/LiTFSI. The lower interfacial resistance after cycling for G$_4$/80 wt % LiTFSI/20 wt % POSS-(LiTFSI)$_8$ suggests that nanoparticles of POSS-(LiTFSI)$_8$ migrate to the electrode/electrolyte interface and promote the formation of a stable solid electrolyte interface (SEI) (Salem and Abu-Lebdeh, Effect of Nanoparticles on Electrolytes and Electrode/Electrolyte Interface. In Nanotechnology for Lithium-Ion Batteries, Abu-Lebdeh, Y.; Davidson, I., Eds. Springer US: Boston, Mass., 2013; pp 221-244; Choudhury, Chemistry of Materials 2016, 28, (7), 2147-2157). Further, the bulk resistance of G$_4$/80 wt % LiTFSI/20 wt % POSS-(LiTFSI)$_8$ did not change during the lithium cycling experiments, indicating that there was no electrolyte degradation. The Li stripping-plating data obtained for G$_4$/POSS-(LiTFSI)$_8$ at O/Li=16/1 using 0.01 mA/cm$^2$ also showed that the cell did not short for >13 days (FIG. 17).

Figure 16B:
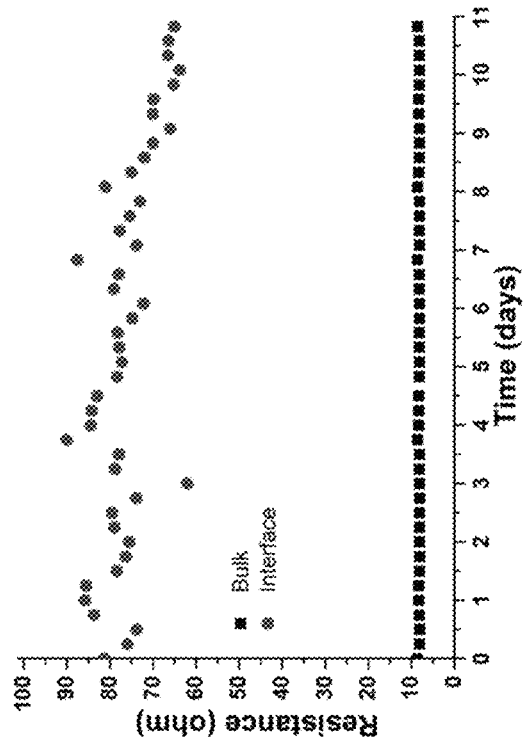
FIGS. 16A and 16B, depicts the time dependence of exemplary composition Li$^0$/[G$_4$+80% LiTFSI+20% POSS-(LiTFSI)$_8$]/Li$^0$ under open circuit voltage (OCV).
Figure 16A:
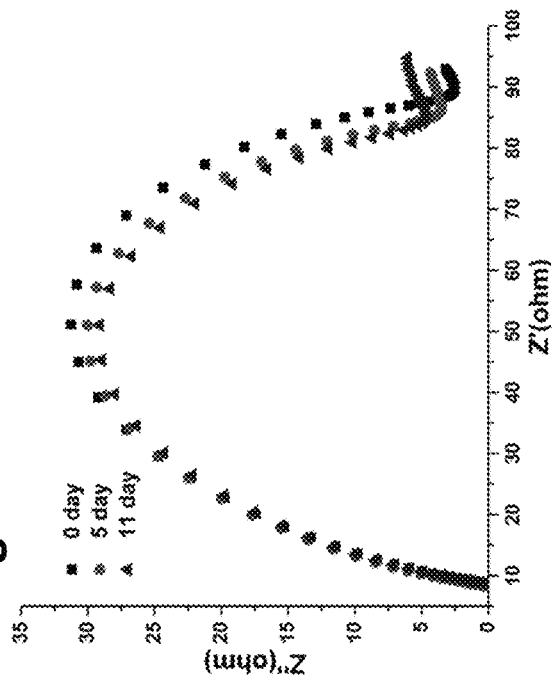

EIS data for Li$^0$/[G$_4$/80 wt % LiTFSI/20 wt % POSS-(LiTFSI)$_8$]/Li$^0$ under open circuit voltage (OCV) as a function of time (FIG. 16) show stable low bulk (7.5Ω) and interfacial (~80Ω) resistance over the 11 days that the experiment was conducted, further corroborating that nanoparticles help form a better interface than in G$_4$/LiTFSI, reducing the interfacial resistance with Li$^0$ metal.

Figure 18A:
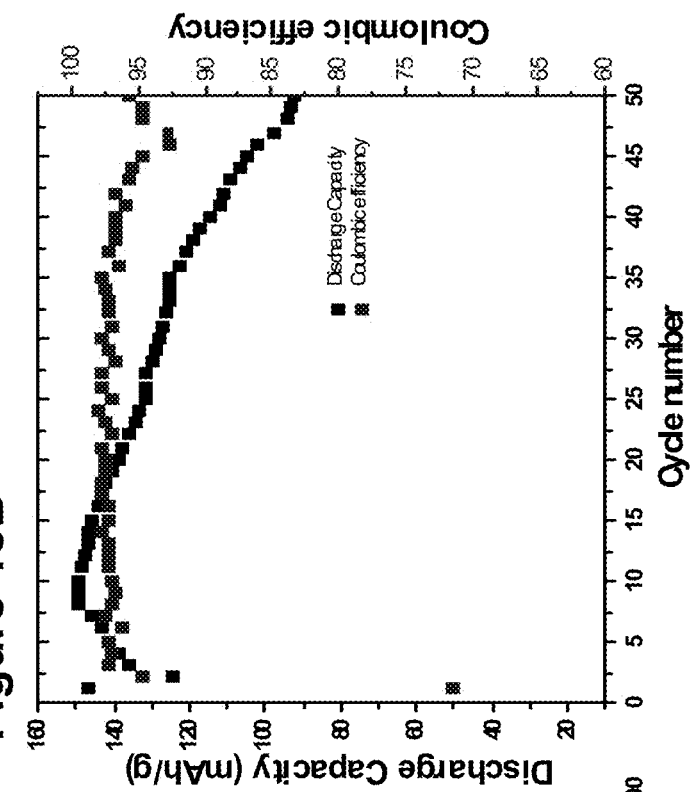
FIGS. 18A and 18B, shows the results of full cell cycling of a Li/(G$_4$/POSS-(LiTFSI)$_8$ O/Li=16/1)/LiFePO$_4$ cell at 0.1 C rate and 25° C.
Figure 18B:
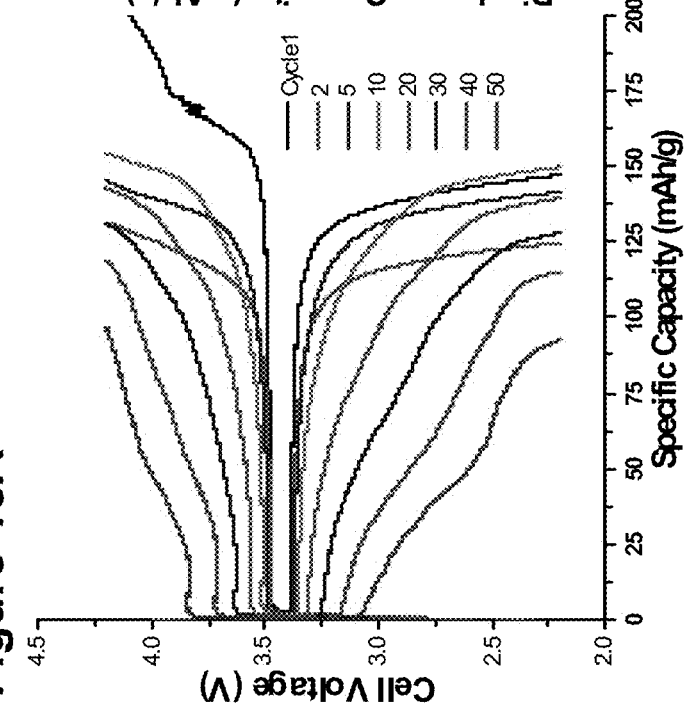

Cycling voltammetry (FIG. 19) and full cell testing at a 0.1 C rate (such that the current corresponds to the Li plating experiment) (FIG. 18) for the G$_4$/POSS-(LiTFSI)$_8$ O/Li=20/1 electrolyte, which has a high bulk resistance, are obtained using Li$^0$/(G$_4$/POSS-(LiTFSI)$_8$ O/Li=16/1)/LiFePO$_4$ cells. The cycling profile at 0.1 C-rate for Li$^0$/(G$_4$/POSS-(LiTFSI)$_8$ O/Li=20/1)/LiFePO$_4$ exhibits cycling behavior in the voltage range between 3 to 4V (FIG. 18). In the first 20 cycles, typical cycling profiles with plateaus were observed at about 3.5V vs. Li upon charging (delithiation) and 3.4V vs. Li during the discharge (lithiation) process. In the first cycle, the discharge capacity is 147 mAh/g (71% Coulombic efficiency) and decreased in the second cycle to 127 mAh/g (95% Coulombic efficiency). Discharge capacity then slowly increased in subsequent cycles and leveled off at a discharge capacity of 140 mAh/g with a Coulombic efficiency of 97.5%. The reasons for the decreased capacity during the second cycle and increase in the subsequent cycles can be the combined effects of SEI formation (in the second cycle) and electrode wetting. After 20 cycles, the voltage corresponding to the plateau region increases and the specific capacity decreases continuously with cycle number. The decreased capacity is the result of the over voltage that arises due to the growth and consolidation of SEI at the lithium surface upon cycling, as observed in the overvoltage studies (FIG. 18) and cyclic voltammetry (FIG. 19) data.

Figure 19:
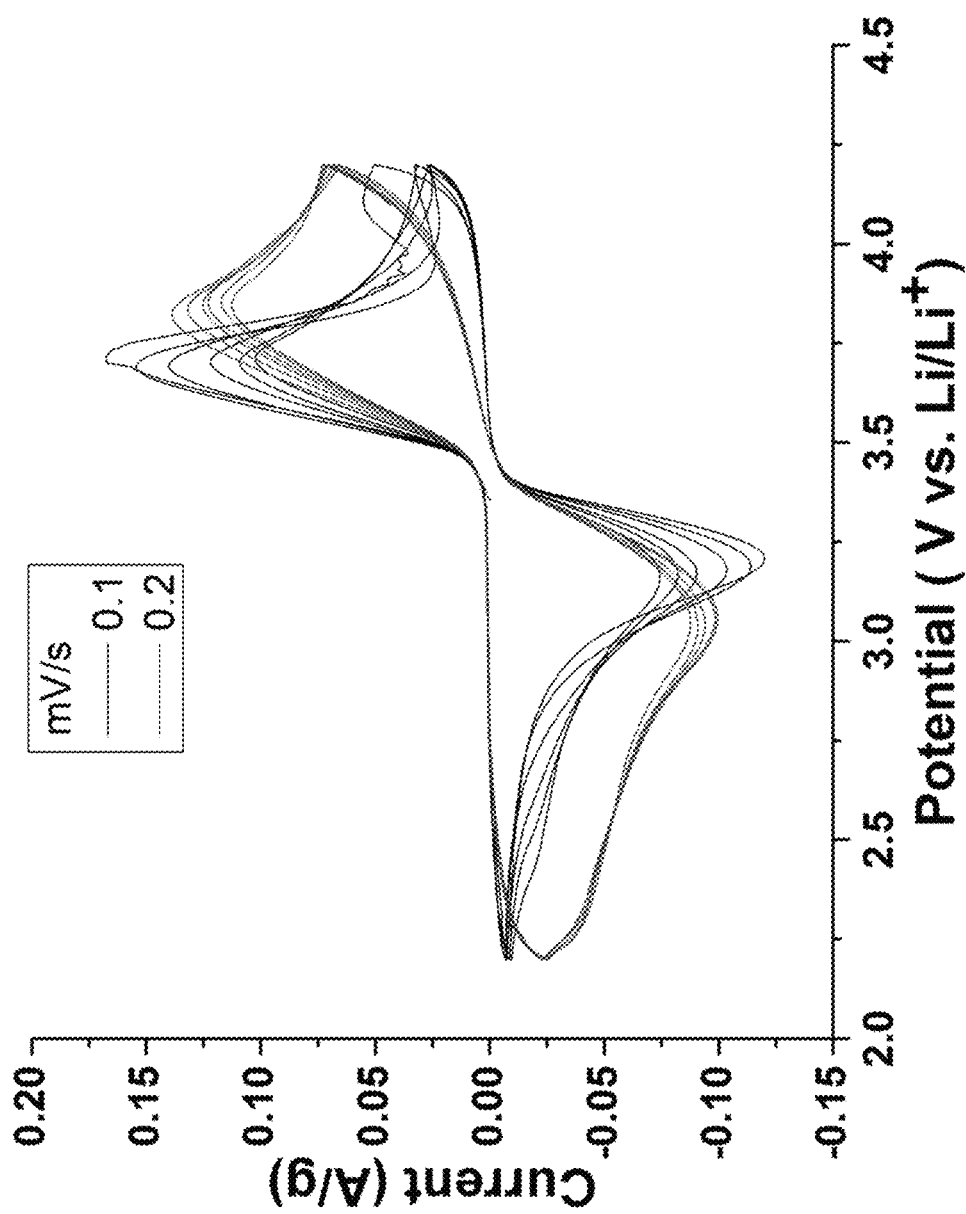
FIG. 19 depicts the cyclic voltammetry (CV) measurement for a Li$^0$/electrolyte/LiFePO$_4$ coin cell, where the electrolyte is G$_4$/POSS-(LiTFSI)$_8$ (O/Li=20/1), at 25° C., showing lithium intercalation and de-intercalation.

CV was used to study the reversibility of the Li/(G$_4$/POSS-(LiTFSI)$_8$ O/Li=20/1)/LiFePO$_4$ system. FIG. 19 shows that at 0.1 mV/s, the system is reversible (peak separation between anodic current and cathodic current is less than 58 mV). At 0.2 mV/s, the peak separation increases to 60 mV, suggesting that lithium ion migration is diffusion controlled. At the higher scan rate, the peaks broaden due to the viscosity of the electrolyte and low bulk conductivity. The high resistance is likely the result of two mass-transfer mechanisms, i.e. Li diffusion in the bulk and Li diffusion through the LiFePO$_4$ particle-electrolyte interface. The peak positions at each scan rate are the same but the height of the peak decreases with cycle number. This result may be due to wetting of the electrode and growth and consolidation of the SEI at the lithium surface upon charging/discharging, consistent with the full cell testing (FIG. 18) and lithium plating-stripping (FIG. 17) experiments. CV and full cell cycling for the $G_{4/20}$% POSS-(LiTFSI)$_8$/80% LiTFSI O/Li=16/1, with lower bulk resistance, higher $t_{Li}^+$ and improved SEIs, are expected to give longer cycling life at higher C rates for use in LMB and LiS batteries.

In conclusion, POSS-(LiTFSI)$_8$ dissolves at high particle loadings in solvents such as tetraglyme (G$_4$) that solvate Li$^+$ ions and forms arrays of isolated nanoparticles, as demonstrated by SAXS (which show absence of aggregates) and TEM images (which show separated particles). This is the result of electrostatic repulsion between the high charge density POSS-(TFSI$^-$) anions. The viscosity of G$_4$/POSS-(LiTFSI)$_8$ is ~ten-fold greater than the viscosity of G$_4$/LiTFSI, so that its conductivity is slightly more than ten-fold less. However, the lithium ion transference number increases from $t_{Li}^+$=0.45 for LiTFSI to $t_{Li}^+$=0.65 for POSS-(LiTFSI)$_8$ due to the large size of the POSS-(TFSI$^-$)$_8$ anions. Interestingly, mixtures of only 10 wt % POSS-(LiTFSI)$_8$ and 90 wt % LiTFSI in tetraglyme have conductivities close to that of G$_4$/LiTFSI, but the same $t_{Li}^+$. This may be the result of inhibition of mobile TFSI$^-$ migration through negatively charged channels formed by the POSS-(TFSI$^-$)$_8$ anions, and free movement of the Li$^+$ ions through the channels. For G$_4$/80 wt % LiTFSI/20 wt % POSS-(LiTFSI)$_8$ O/Li=17.1/1, $\sigma$=3.3×10$^{-3}$ S/cm and $t_{Li}^+$=0.70. In this case, the POSS-(TFSI$^-$)$_8$ cubes will be approximately 3-4 diameters apart (using assumptions of POSS-(LiTFSI)$_8$ radius ~0.75 nm and G$_4$ density ~1 mg/mL). If the POSS-(TFSI$^-$)$_8$ cubes are brought closer together and the tortuous path diameters decreased by reducing the O/Li, this may further restrict migration of TFSI$^-$ anions through the channels and increase $t_{Li}^+$ but possibly at the expense of decreased conductivity. Immobilization of the channels by dissolution, and subsequent polymerization, of POSS-(LiTFSI)$_8$/LiTFSI in PEG-acrylates and diacrylates may also increase $t_{Li}^+$, but decrease conductivity. The addition of POSS-(LiTFSI)$_8$ also contributes to the formation of a stable SEI layer.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A composition comprising:
   a polyether solvent; and
   a polyoligomeric silsesquioxane of Formula (I):

[(O$_{1.5}$)Si-L-X]$_n$Y$_n$,   Formula (I);

wherein n is an even integer;
   L is a divalent linking group;
   Y is a cationic group selected from the group consisting of Li$^+$, Na$^+$, K$^+$, and Mg$^{2+}$; and
   X is an anionic group.

2. The composition of claim 1, wherein the polyether solvent is tetraglyme.

3. The composition of claim 1, wherein n is 8.

4. The composition of claim 1, wherein L is selected from the group consisting of alkyl, siloxane, heteroatom, and combinations thereof.

5. The composition of claim 1, wherein L is —OSi(Me)$_2$(CH$_2$)$_3$—; and wherein the O is bound to the silicon atom of Formula (I).

6. The composition of claim 1, wherein X is —[NSO$_2$CF$_3$]$^-$.

7. The composition of claim 1, wherein the polyoligomeric silsesquioxane of Formula (I) is a polyoligomeric silsesquioxane of Formula (II):

[(O$_{1.5}$)Si—OSi(Me)$_2$(CH$_2$)$_3$—NSO$_2$CF$_3$]$_n$Li$_n$,   Formula (II);

wherein n is an even integer selected from the group consisting of 6, 8, 10, and 12.

8. The composition of claim 1, further comprising an additional lithium salt.

9. The composition of claim 8, wherein the additional lithium salt is selected from the group consisting of lithium bis(trifluoromethanesulfonyl)imide, lithium trifluoromethanesulfonate, and lithium tetrafluoroborate.

10. The composition of claim 8, wherein the weight ratio of the additional lithium salt to the polyoligomeric silsesquioxane of Formula (I) is about 80/20.

11. The composition of claim 8, wherein the ratio of the number ether oxygens in the polyether solvent to the number of Li$^+$ ions in the composition is between about 20/1 and about 9/1.

12. A liquid electrolyte comprising arrays of disordered particles of a polyoligomeric silsesquioxane of Formula (I) in a polyether solvent:

[(O$_{1.5}$)Si-L-X]$_n$Li$_n$,   Formula (I);

wherein in Formula (I), n is an even integer;
   L is a divalent linking group; and
   X is an anionic group.

13. The liquid electrolyte of claim 12, further comprising lithium bis(trifluoromethanesulfonyl)imide.

14. The liquid electrolyte of claim 13, wherein the ratio of the number ether oxygens in the polyether solvent to the number of Li$^+$ ions in the polyoligomeric silsesquioxane of Formula (I) and the lithium bis(trifluoromethanesulfonyl)imide is about 17.1/1.

15. The liquid electrolyte of claim 12, wherein the polyether solvent is tetraglyme.

16. The liquid electrolyte of claim 12, wherein L is —OSi(Me)$_2$(CH$_2$)$_3$—;
   wherein the O is bound to the silicon atom of Formula (I); and
   X is —[NSO$_2$CF$_3$]$^-$.

17. A battery comprising the liquid electrolyte of claim 12.

18. A method for forming a composition, the method comprising:
   adding a polyoligomeric silsesquioxane of Formula (I) to a polyether solvent under an inert atmosphere:

[(O$_{1.5}$)Si-L-X]$_n$Li$_n$,   Formula (I);

wherein in Formula (I), n is an even integer;
   L is a divalent linking group; and
   X is an anionic group.

19. The method of claim 18, further comprising the step of adding an additional lithium salt to the polyether solvent.

20. The method of claim 19, wherein the additional lithium salt is lithium bis(trifluoromethanesulfonyl)imide.

* * * * *